United States Patent
Vysotsky et al.

(10) Patent No.: US 12,445,373 B2
(45) Date of Patent: Oct. 14, 2025

(54) SYSTEMS AND METHODS FOR MANAGING NETWORK SERVICES BY AN SD-WAN APPLICATION AND AN SD-WAN DEVICE

(71) Applicant: Citrix Systems, Inc., Fort Lauderdale, FL (US)

(72) Inventors: Vladimir Vysotsky, San Jose, CA (US); Snigdhendu S Mukhopadhyay, Fremont, CA (US)

( * ) Notice: Subject to any disclaimer, the term of this patent is extended or adjusted under 35 U.S.C. 154(b) by 757 days.

(21) Appl. No.: 17/580,326

(22) Filed: Jan. 20, 2022

(65) Prior Publication Data
US 2023/0254243 A1    Aug. 10, 2023

(51) Int. Cl.
*H04L 45/302* (2022.01)
*H04L 45/02* (2022.01)
*H04L 67/141* (2022.01)

(52) U.S. Cl.
CPC ............ *H04L 45/306* (2013.01); *H04L 45/02* (2013.01); *H04L 67/141* (2013.01)

(58) Field of Classification Search
None
See application file for complete search history.

(56) References Cited

U.S. PATENT DOCUMENTS

| | | | | |
|---|---|---|---|---|
| 11,502,895 | B1* | 11/2022 | Van Oort | H04L 12/4633 |
| 12,190,168 | B2* | 1/2025 | Young | G06F 9/547 |
| 2020/0204452 | A1* | 6/2020 | Bhat | H04L 41/147 |
| 2021/0144065 | A1* | 5/2021 | Bhat | H04L 43/55 |
| 2022/0107845 | A1* | 4/2022 | Young | G06F 11/3006 |
| 2023/0134539 | A1* | 5/2023 | Wang | H04L 41/147 709/223 |
| 2024/0129193 | A1* | 4/2024 | Wang | H04L 41/0893 |
| 2024/0205205 | A1* | 6/2024 | Hou | H04L 45/34 |
| 2024/0298180 | A1* | 9/2024 | Olofsson | H04L 12/4641 |

* cited by examiner

*Primary Examiner* — Phirin Sam

(57) ABSTRACT

Systems and methods for managing network services by an SD-WAN application and an SD-WAN device include a software-defined wide area network (SD-WAN) application executing on a client device detecting a presence of an SD-WAN device. The SD-WAN application establishes a connection between the SD-WAN application and the SD-WAN device. The SD-WAN application updates a configuration of the SD-WAN application, to cause the SD-WAN application to interoperate with the SD-WAN device for managing one or more network services.

18 Claims, 13 Drawing Sheets

```
                    1100
                     │
                     ▼
    ┌─────────────────────────────────────┐
    │  DETECT PRESENCE OF DEVICE 1102    │
    └─────────────────────────────────────┘
                     │
                     ▼
    ┌─────────────────────────────────────┐
    │   ESTABLISH CONNECTION 1104        │
    └─────────────────────────────────────┘
                     │
                     ▼
    ┌─────────────────────────────────────┐
    │   UPDATE CONFIGURATION 1106        │
    └─────────────────────────────────────┘
```

SYSTEMS AND METHODS FOR MANAGING NETWORK SERVICES BY AN SD-WAN APPLICATION AND AN SD-WAN DEVICE

FIELD OF THE DISCLOSURE

The present application generally relates to networking, including but not limited to systems and methods for managing network services by an SD-WAN application and an SD-WAN device.

BACKGROUND

Services such as SD-WAN or traditional VPN usually have a single active tunnel connecting the client to remote SD-WAN or VPN service destination, which limits traffic delivery optimization to simple rules based on well-known network routing algorithms.

SUMMARY

This Summary is provided to introduce a selection of concepts in a simplified form that is further described below in the Detailed Description. This Summary is not intended to identify key features or essential features, nor is it intended to limit the scope of the claims included herewith.

Software client solutions are typically limited in that they solve domain-specific problems, including but not limited to VPN connectivity, secure internet access via a tunnel to a Cloud Exchange, application awareness and optimization delivery, Secure Web Gateways (SWG)/Cloud Access Security Brokers (CASB), and others. The implementations described herein can enable leveraging of ICA, SDWAN virtual path, Gateway Service, Virtual Desktops, and software integration hooks (browser add-ons, calendar integration, application insights to differentiate between real-time and bulk traffic) to deliver a comprehensive endpoint solution. Such a software endpoint solution is advantageous for the differentiation and success of SD-WAN, as it involves from an on-premises product to a cloud service.

The systems and methods described herein deliver a more comprehensive feature set for application traffic delivery and security in an endpoint software client and service capable of establishing and maintaining multiple virtual network connections with associated rich application routing policies. The systems and methods described herein can address several integration points between the traffic delivery solution and application management solutions.

The systems and methods described herein can enable clients to maintain multiple tunnel connections to remote service locations in parallel and using this capability to deliver the best combination of quality, cost and security. The systems and methods described herein can enable integration points between the application virtualization service and the client service SD-WAN system. The systems and methods described herein can implement an SD-WAN client application collecting in-depth information about correlations and dependencies among different types of traffic by using browser add-ons (or other available introspection techniques, such as accessibility APIs), or by for non-browser applications, by monitoring traffic generation by an application process over its lifetime, as well as by associating traffic generated by child processes with their parent application processes.

SD-WAN systems can provide SD-WAN features on demand (e.g., bringing up tunnels when application attempts to establish connectivity are detected, or enabling more costly wireless connectivity when wired connectivity is failing). The systems and methods described herein can use SD-WAN clients for providing SD-WAN features ahead of time, before anticipated usage, which would result in superior user experience and minimize any possible downtime (by eliminating the time needed to react to application demand). The systems and methods described herein can enable an application client to collect both historic and predictive information about application usage and other aspects important for SD-WAN operation and use this information to manage the state of the SD-WAN framework.

The systems and methods described herein include an SD-WAN client implementation that enables lightweight SD-WAN appliance deployment, allows SD-WAN to coexist with other wide area connectivity frameworks, and thus reduces customer reluctance to adopt SD-WAN for some of their application traffic delivery needs. An SD-WAN software client, in addition to its normal SD-WAN capabilities designed for operation in arbitrary networks, may include the ability to detect the presence of a compatible SD-WAN appliance and, if desired, establish a trusted association with that appliance.

In one aspect, this disclosure is directed to a method. The method includes detecting, by a software-defined wide area network (SD-WAN) application executing on a client device, a presence of an SD-WAN device. The method includes establishing, by the SD-WAN application, a connection between the SD-WAN application and the SD-WAN device. The method includes updating, by the SD-WAN application, a configuration of the SD-WAN application, to cause the SD-WAN application to interoperate with the SD-WAN device for managing one or more network services.

In some embodiments, updating the configuration causes the SD-WAN application to transmit network traffic of the client device to the SD-WAN device via the connection. In some embodiments, the connection includes a first connection. Updating the configuration of the SD-WAN application may include switching, by the SD-WAN application from a first configuration of the SD-WAN application to a second configuration of the SD-WAN application. The first configuration may cause the SD-WAN application to manage the one or more network services via one or more second connections of the SD-WAN application. The second configuration may cause the SD-WAN application to interoperate with the SD-WAN device for managing the one or more network services via the first connection. In some embodiments, detecting the presence includes determining, by the SD-WAN application, that the SD-WAN device is on a network of the client device and that the SD-WAN device is compatible with the SD-WAN appliance.

In some embodiments, the connection is a first connection. The SD-WAN application may maintain one or more second connections to one or more remote endpoints. The method may further include receiving, by the SD-WAN application, first network traffic for one or more enterprise resources via the first connection from the SD-WAN device. The method may further include receiving, by the SD-WAN application, second network traffic for one or more third-party resources via the one or more second connections from the one or more remote endpoints. In some embodiments, the method further includes receiving, by the SD-WAN application, from the SD-WAN device, a discovery request on a network of the client device, Detecting the presence of the SD-WAN device may be based on the discovery request. In some embodiments, the method further includes probing, by the SD-WAN application, a resource for identifying the SD-WAN device. Detecting the presence of the SD-WAN device may be based on a response from the resource.

In some embodiments, the method includes assigning, by the SD-WAN application, one or more tags to network traffic of the client device. The method may include transmitting, by the SD-WAN application, the network traffic and the one or more tags to the SD-WAN device, the SD-WAN device routing the network traffic via one or more channels of the SD-WAN device using the one or more tags. In some embodiments, detecting the presence of the SD-WAN device is at a first time instance. Updating the configuration may include switching from a first configuration to a second configuration causing the SD-WAN application to interoperate with the SD-WAN device for managing the one or more network services. The method may include detecting, by the SD-WAN application, an absence of the SD-WAN device at a second time instance after the first time instance. The method may include switching, by the SD-WAN application, from the second configuration of the SD-WAN application to the first configuration, to cause the SD-WAN application to manage the one or more network services. In some embodiments, at the first time instance, the SD-WAN appliance and the SD-WAN device are connected to a first network, and wherein, at the second time instance, the SD-WAN appliance is not connected to the first network.

In another aspect, this disclosure is directed to a device. The device includes one or more processors configured to detect, by a software-defined wide area network (SD-WAN) application executing on the device, a presence of an SD-WAN device. The one or more processors are configured to establish, by the SD-WAN application, a connection between the SD-WAN application and the SD-WAN device. The one or more processors are configured to update, by the SD-WAN application, a configuration of the SD-WAN application, to cause the SD-WAN application to interoperate with the SD-WAN device for managing one or more network services.

In some embodiments, updating the configuration causes the SD-WAN application to transmit network traffic of the device to the SD-WAN device via the connection. In some embodiments, the connection comprises a first connection. Updating the configuration of the SD-WAN application may include switching, by the SD-WAN application from a first configuration of the SD-WAN application to a second configuration of the SD-WAN application. The first configuration may cause the SD-WAN application to manage the one or more network services via one or more second connections of the SD-WAN application. The second configuration may cause the SD-WAN application to interoperate with the SD-WAN device for managing the one or more network services via the first connection. In some embodiments, detecting the presence includes determining, by the SD-WAN application, that the SD-WAN device is on a network of the device and that the SD-WAN device is compatible with the SD-WAN appliance.

In some embodiments, the connection is a first connection. The SD-WAN application may maintain one or more second connections to one or more remote endpoints. The one or more processors may be further configured to receive, by the SD-WAN application, first network traffic for one or more enterprise resources via the first connection from the SD-WAN device. The one or more processors may be further configured to receive, by the SD-WAN application, second network traffic for one or more third-party resources via the one or more second connections from the one or more remote endpoints. In some embodiments, the one or more processors are further configured to receive, by the SD-WAN application, from the SD-WAN device, a discovery request on a network of the device. Detecting the presence of the SD-WAN device may be based on the discovery request.

In some embodiments, the one or more processors are further configured to probe, by the SD-WAN application, a resource for identifying the SD-WAN device. Detecting the presence of the SD-WAN device may be based on a response from the resource. In some embodiments, the one or more processors are further configured to assign, by the SD-WAN application, one or more tags to network traffic of the device. The one or more processors may be further configured to transmit, by the SD-WAN application, the network traffic and the one or more tags to the SD-WAN device, the SD-WAN device routing the network traffic via one or more channels of the SD-WAN device using the one or more tags. In some embodiments, detecting the presence of the SD-WAN device is at a first time instance when the SD-WAN device and the SD-WAN appliance are connected to a first network. Updating the configuration may include switching from a first configuration to a second configuration causing the SD-WAN application to interoperate with the SD-WAN device for managing the one or more network services. The one or more processors may be further configured to detect, by the SD-WAN application, an absence of the SD-WAN device at a second time instance after the first time instance, wherein, at the second time instance, the SD-WAN appliance is not connected to the first network. The one or more processors may be further configured to switch, by the SD-WAN application, from the second configuration of the SD-WAN application to the first configuration, to cause the SD-WAN application to manage the one or more network services.

In another aspect, this disclosure is directed to a non-transitory computer readable medium storing instructions that, when executed by one or more processors, cause the one or more processors to detect, by a software-defined wide area network (SD-WAN) application executing on a client device, a presence of an SD-WAN device. The instructions further cause the one or more processors to establish, by the SD-WAN application, a connection between the SD-WAN application and the SD-WAN device. The instructions further cause the one or more processors to update, by the SD-WAN application, a configuration of the SD-WAN application, to cause the SD-WAN application to interoperate with the SD-WAN device for managing one or more network services.

BRIEF DESCRIPTION OF THE DRAWING FIGURES

Objects, aspects, features, and advantages of implementations disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, with emphasis instead being placed upon illustrating implementations, principles, and concepts. The drawings are not intended to limit the scope of the claims included herewith.

DETAILED DESCRIPTION

Figure 1A:
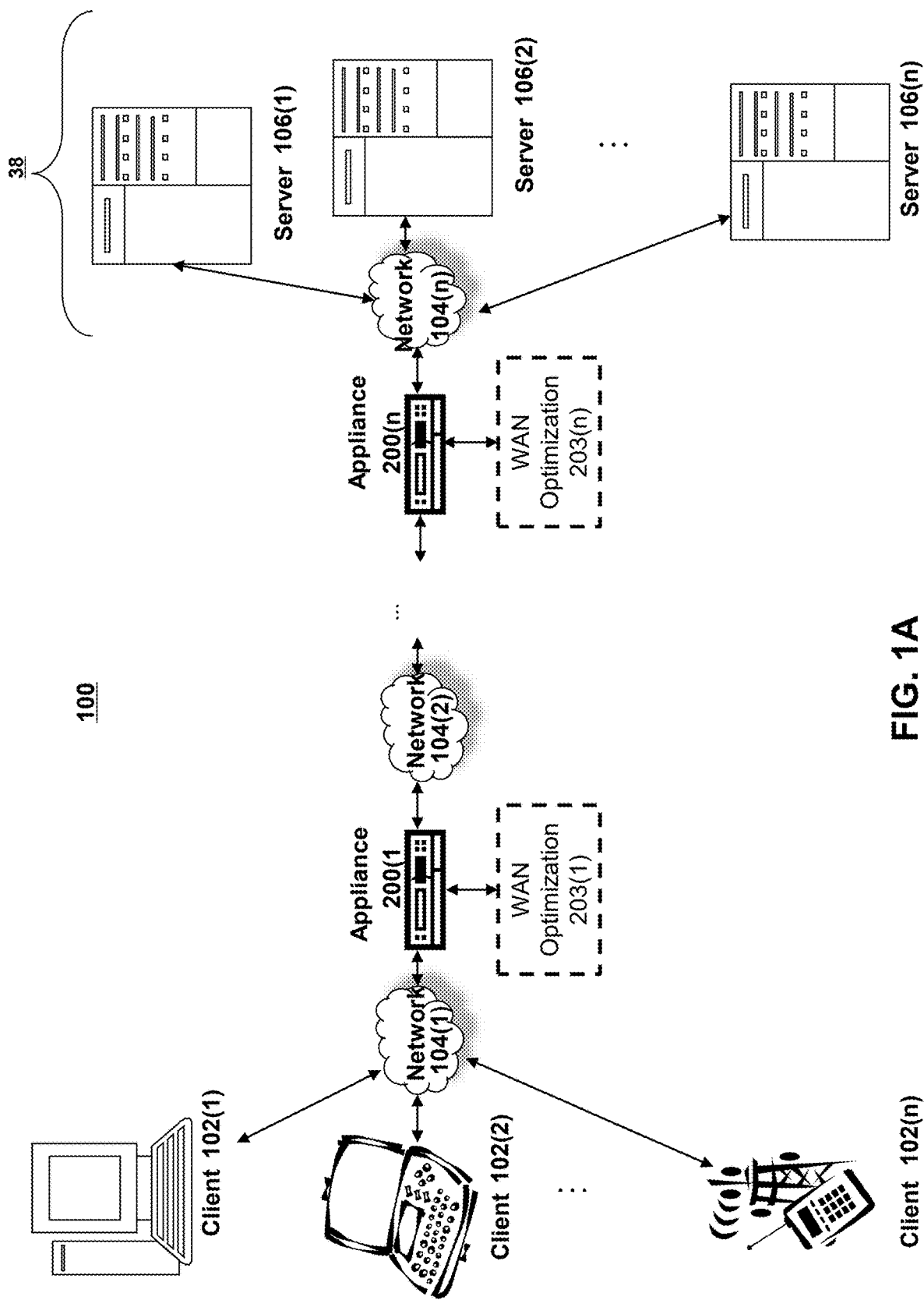
FIG. 1A is a block diagram of a network computing system, in accordance with an illustrative implementation.

There are several disparities between the feature sets of a) appliance-based SD-WAN products ("SD-WAN appliances") and b) endpoint software clients that intercept user traffic on the endpoint and send it through a virtual network connection ("tunnel clients"), such as VPN clients, software SD-WAN clients, or cloud SaaS clients:

SD-WAN appliance products typically implement multiple virtual connections to remote sites or to the Internet, and support smart traffic routing policies to deliver user or application network traffic to the right destination that utilize these multiple virtual connections as destinations. Tunnel clients usually implement a single virtual network connection (tunnel), and limit their routing policies to either sending all application traffic through the single available tunnel ("full VPN") or letting some traffic bypass the tunnel and use the physical network connection ("split VPN"). Thus, the ability of tunnel clients to optimize traffic delivery to multiple tunnel destinations is limited compared to SD-WAN appliance products.

Tunnel clients can directly determine certain aspects of user network traffic that are important for security and quality of network connectivity, such as the type or specific version of application software that originates specific network flows, endpoint location, endpoint configuration, endpoint security posture, etc. SD-WAN appliance solutions typically do not have access to this information and are limited to such potentially less accurate techniques as traffic classification using network source and destination addresses, or traffic content inspection ("deep packet inspection," or DPI). SD-WAN appliance solutions are more limited in their ability to classify application traffic and apply various policies for application routing and access security.

For purposes of reading the description of the various implementations below, the following descriptions of the sections of the specification and their respective contents may be helpful:

- Section A describes a network environment and computing environment which may be useful for practicing implementations described herein;
- Section B describes implementations of systems and methods for delivering a computing environment to a remote user;
- Section C describes implementations of systems and methods for providing a clustered appliance architecture environment;
- Section D describes implementations of systems and methods for providing a clustered appliance architecture environment;
- Section E describes implementations of systems and methods for an SD-WAN application;
- Section F describes implementations of systems and methods for selecting tunnels for transmitting network traffic by an SD-WAN application;
- Section G describes implementations of systems and methods for updating a configuration of an SD-WAN application using historic or predictive data; and
- Section H describes implementations of systems and methods for managing network services by an SD-WAN application and an SD-WAN device.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some implementations, a client 102 may communicate with a server 106 via one or more appliances 200(1)-200n (generally referred to as appliance(s) 200 or gateway(s) 200).

Although the implementation shown in FIG. 1A shows one or more networks 104 between clients 102 and servers 106, in other implementations, clients 102 and servers 106 may be on the same network 104. The various networks 104 may be the same type of network or different types of networks. For example, in some implementations, network 104(1) may be a private network such as a local area network (LAN) or a company Intranet, while network 104(2) and/or network 104(n) may be a public network, such as a wide area network (WAN) or the Internet. In other implementations, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other implementations, the appliance 200 may be located on a network 104. For example, appliance 200 may be implemented as part of one of clients 102 and/or servers 106. In an implementation, appliance 200 may be implemented as a network device such as Citrix networking (formerly NetScaler®) products sold by Citrix Systems, Inc., of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an implementation, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some implementations, appliances 200 may include, be replaced by, or be in communication with, one or more additional appliances, such as WAN optimization appliances 203(1)-203(n), referred to generally as WAN optimization appliance(s) 205. In some implementations, the WAN optimization appliance(s) 205 may be used for optimizing a software-defined WAN (SD-WAN). For example, WAN optimization appliance 205 may accelerate, cache, compress or otherwise optimize or improve performance, operation, flow control, or quality of service of network traffic, such as traffic to and/or from a WAN (or SD-WAN) connection, such as optimizing Wide Area File Services (WAFS), accelerating Server Message Block (SMB) or Common Internet File System (CIFS). In some implementations, appliance 205 may be a performance enhancing proxy or a WAN optimization controller. In one implementation, appliance 205 may be implemented as Citrix SD-WAN products sold by Citrix Systems, Inc., of Fort Lauderdale, FL.

Figure 1B:
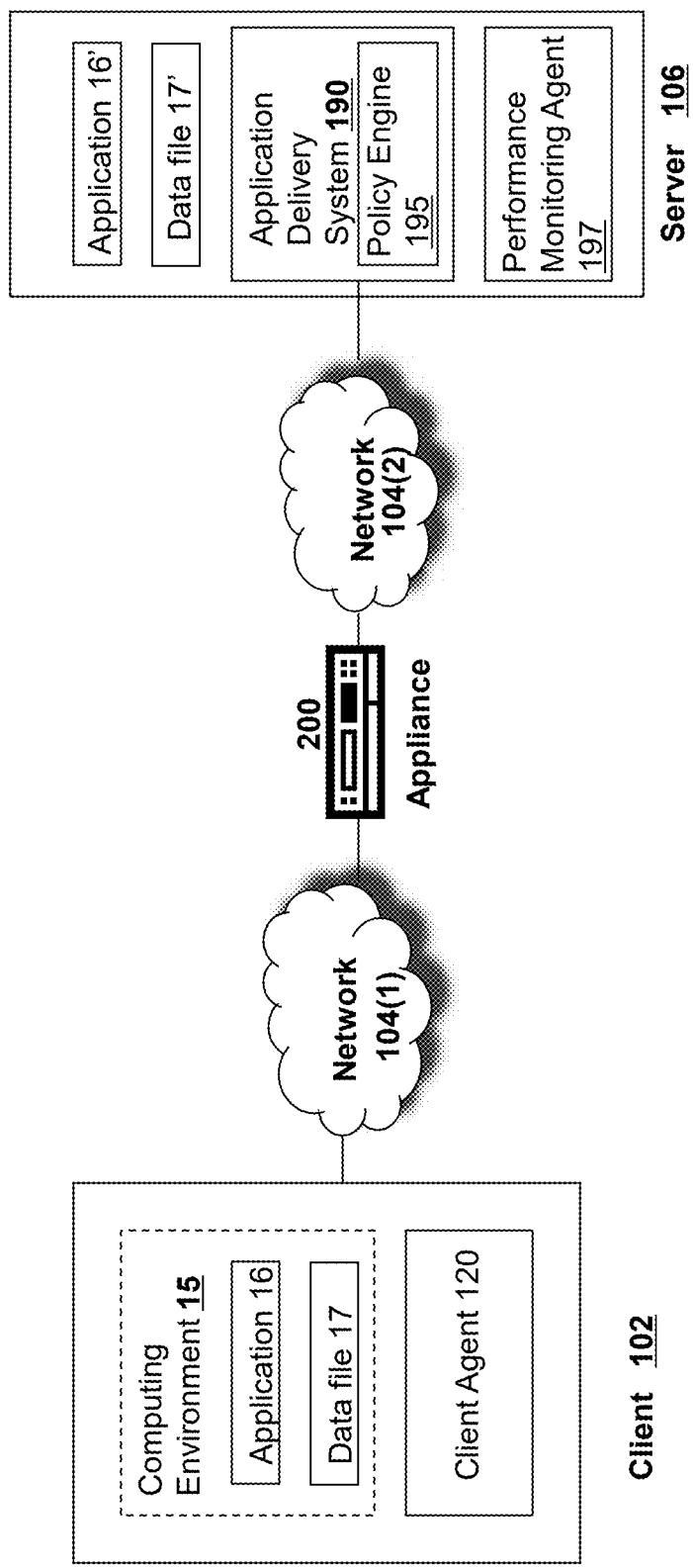
FIG. 1B is a block diagram of a network computing system for delivering a computing environment from a server to a client via an appliance, in accordance with an illustrative implementation.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include a client agent 120 and computing environment 15. Computing environment 15 may execute or operate an application 16 that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an implementation, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some implementations, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc., of Fort Lauderdale, FL. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS), platform as a service (PaaS), a CITRIX managed desktop service (CMD service) or a CITRIX virtual applications and desktops service (CVAD service).

One or more of servers 106 may include a performance monitoring service or agent 197. In some implementations, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some implementations, monitoring agent 197 includes any of the product implementations referred to as Citrix Analytics or Citrix Application Delivery Management by Citrix Systems, Inc., of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real time, to optimize application delivery by servers 106 to clients 102 based upon network environment performance and conditions.

In described implementations, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
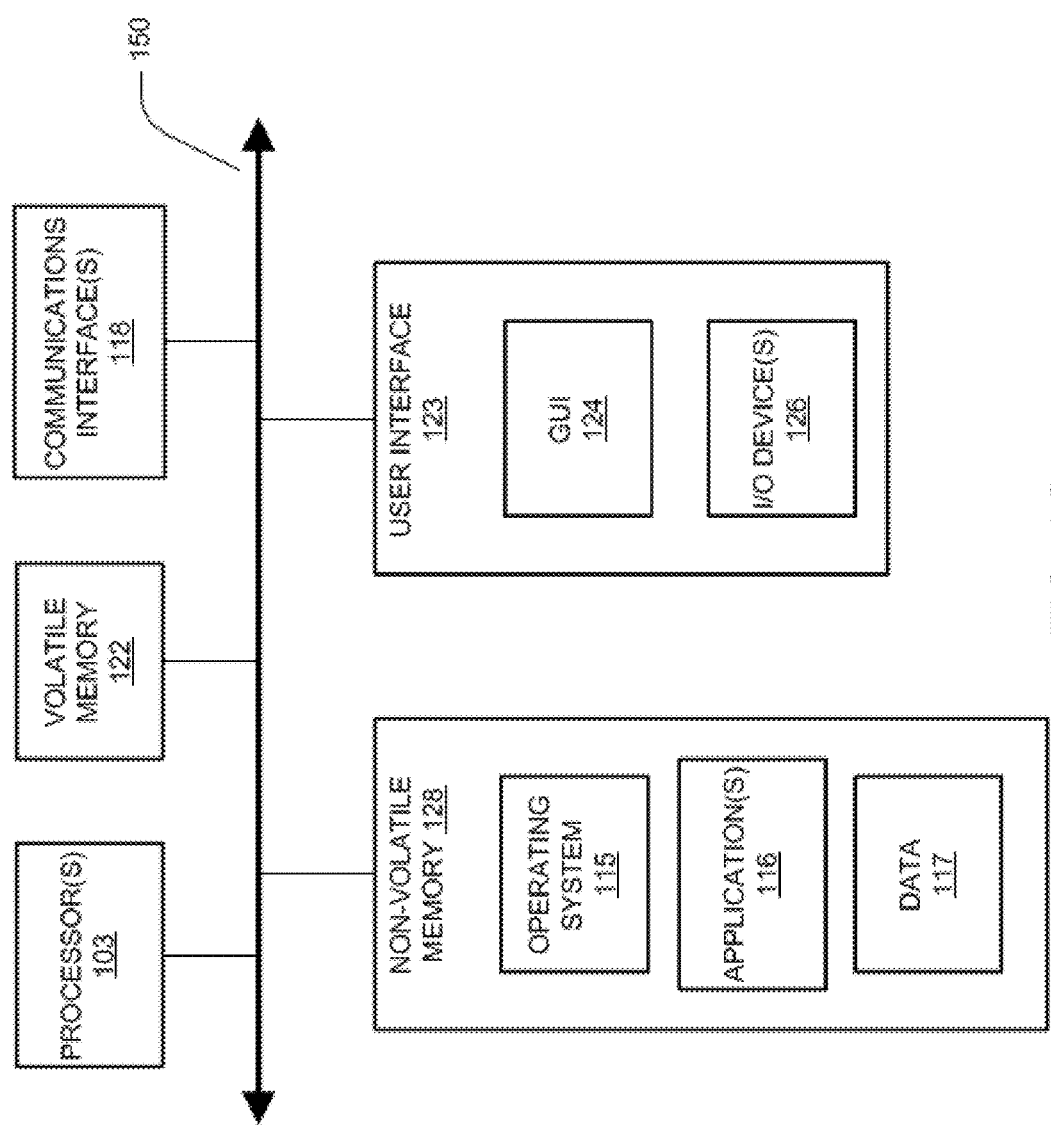
FIG. 1C is a block diagram of a computing device, in accordance with an illustrative implementation.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some implementations, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some implementations, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described implementations, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
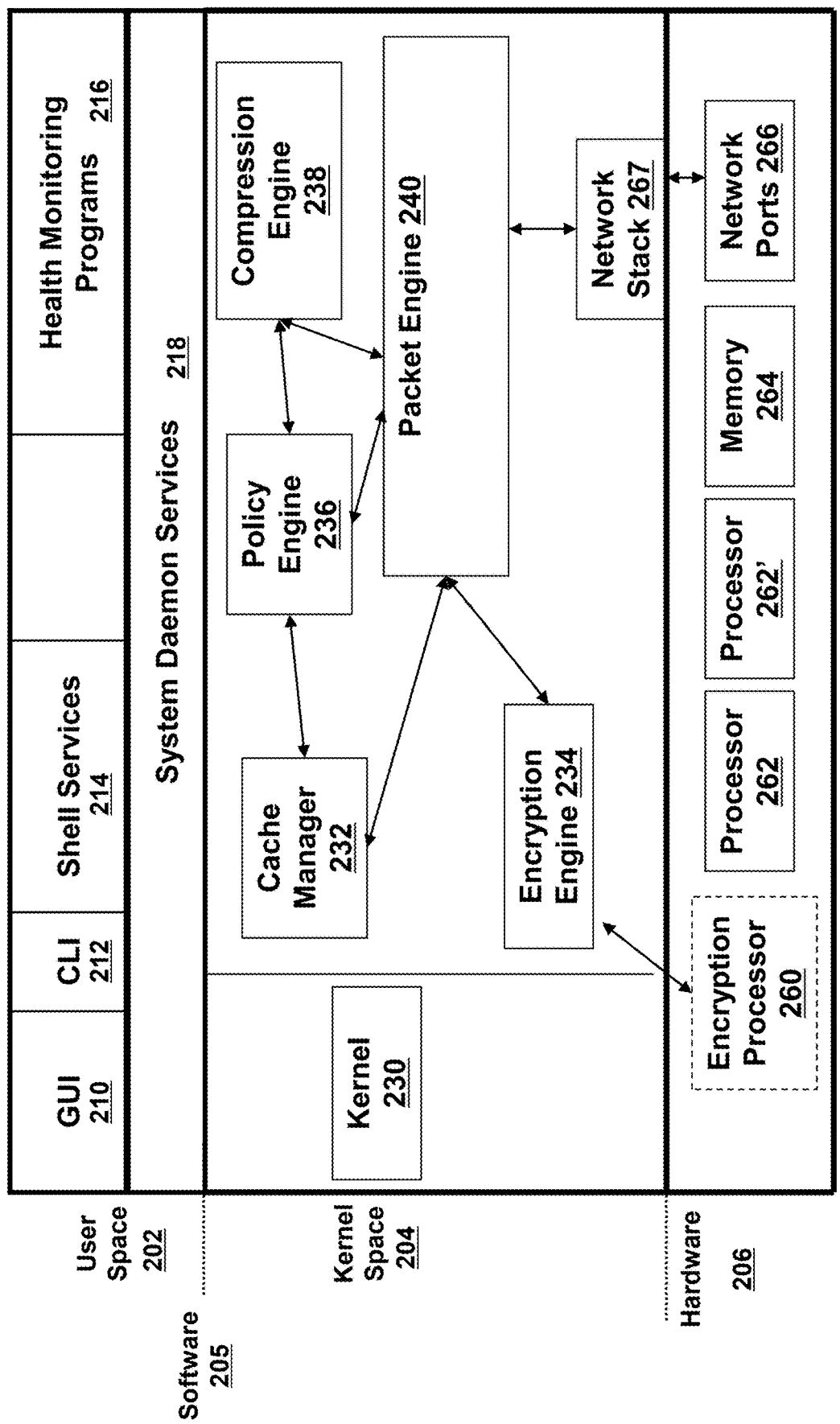
FIG. 2 is a block diagram of an appliance for processing communications between a client and a server, in accordance with an illustrative implementation.

FIG. 2 shows an example implementation of appliance 200. As described herein, appliance 200 may be implemented as a server, gateway, router, switch, bridge or other type of computing or network device. As shown in FIG. 2, an implementation of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236, and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure. In some implementations, one or more of processes 232, 234, 236, 238, 240, and 267 run in the user space 202. For example, the kernel space 204 can expose the network ports 266 to receive packets while the user space 202 can process the packets.

Cache manager 232 may duplicate original data stored elsewhere or data previously computed, generated or transmitted to reducing the access time of the data. In some implementations, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some implementations, encryption engine 234 may use a tunneling protocol to provide a VPN between a client 102 and a server 106. In some implementations, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some implementations, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task, or thread executing on appliance 200.

Daemon services 218 are programs that run continuously or in the background and handle periodic service requests received by appliance 200. In some implementations, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some implementations, client agent 120 is implemented as an Independent Computing Architecture (ICA) client developed by Citrix Systems, Inc., of Fort Lauderdale, FL. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Virtualizing an Application Delivery Controller

Figure 3:
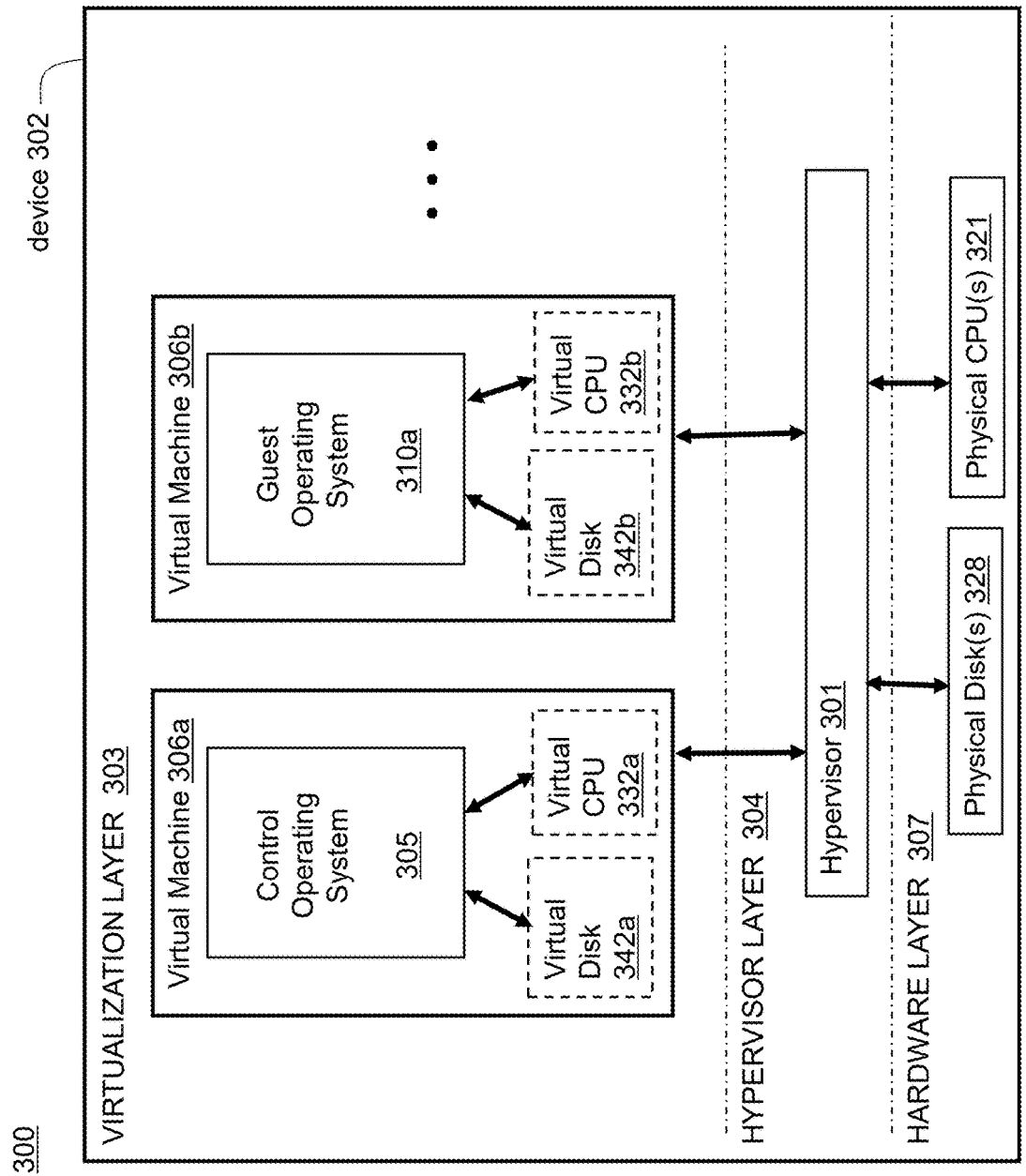
FIG. 3 is a block diagram of a virtualization environment, in accordance with an illustrative implementation.

Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some implementations, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative implementation, hypervisor(s) 301 may be implemented as a Citrix Hypervisor by Citrix Systems, Inc., of Fort Lauderdale, FL. In an illustrative implementation, device 302 executing a hypervisor that creates a virtual machine platform on which guest operating systems may execute is referred to as a host server.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some implementations, one of VMs 306 (e.g., the VM executing control operating system 305) may manage and configure other of VMs 306, for example by managing the execution and/or termination of a VM and/or managing allocation of virtual resources to a VM. In various implementations, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some implementations, VMs 306 may be implemented as fully virtualized VMs that are not aware that they are virtual machines (e.g., a Hardware Virtual Machine or HVM). In other implementations, the VM may be aware that it is a virtual machine, and/or the VM may be implemented as a paravirtualized (PV) VM.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106, or appliance 200. Virtual appliances may provide functionality for availability, performance, health monitoring, caching and compression, connection multiplexing and pooling, and/or security processing (e.g., firewall, VPN, encryption/decryption, etc.), similarly as described in regard to appliance 200.

In some implementations, a server may execute multiple virtual machines 306, for example on various cores of a multi-core processing system and/or various processors of a multiple processor device. For example, although generally shown herein as "processors" (e.g., in FIGS. 1C, 2, and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In implementations employing multiple processors and/or multiple processor cores, described implementations may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some implementations, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
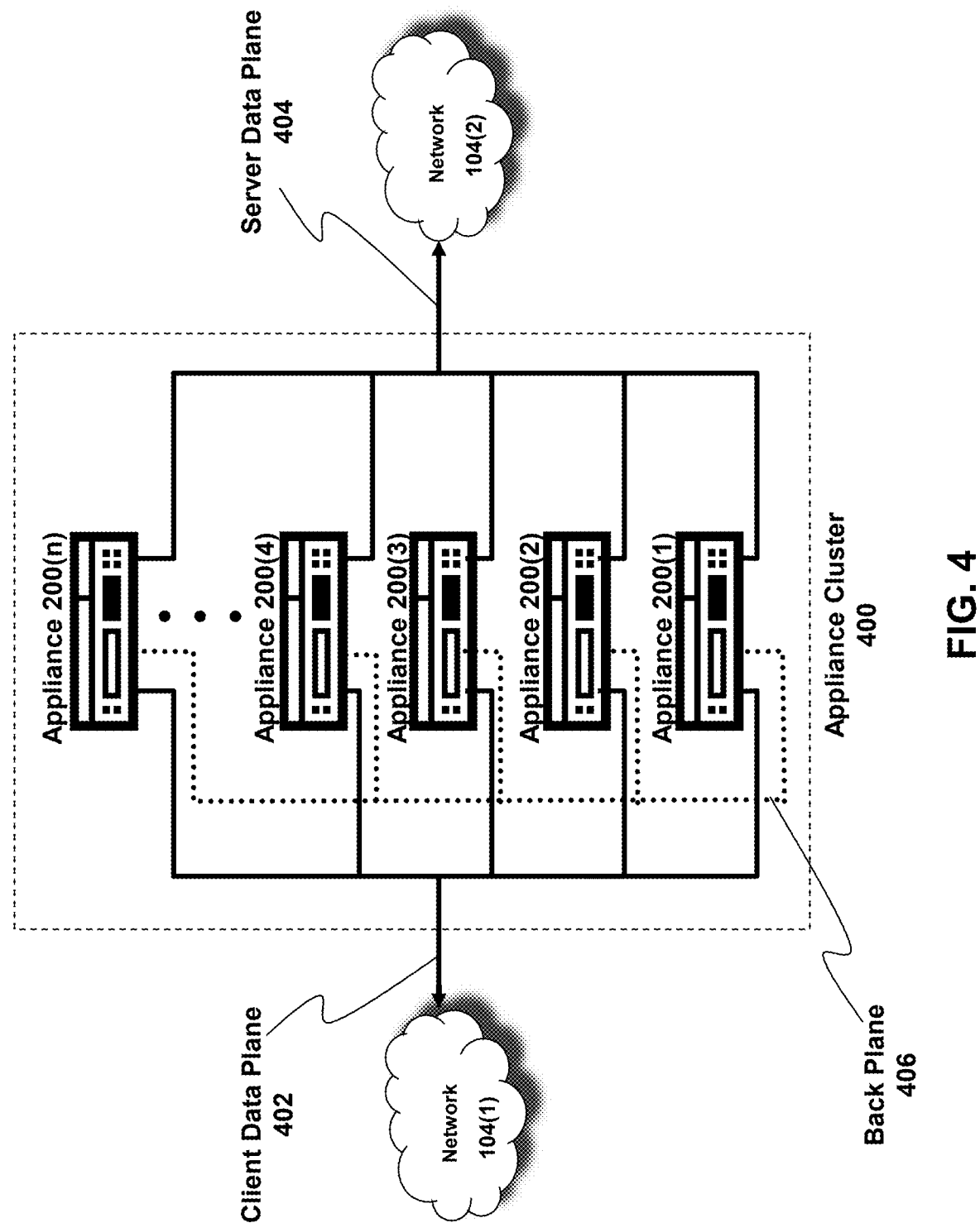
FIG. 4 is a block diagram of a cluster system, in accordance with an illustrative implementation.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some implementations, each appliance 200 of cluster 400 may be implemented as a multi-processor and/or multi-core appliance, as described herein. Such implementations may employ a two-tier distribution system, with one appliance if the cluster distributing packets to nodes of the cluster, and each node distributing packets for processing to processors/cores of the node. In many implementations, one or more of appliances 200 of cluster 400 may be physically grouped or geographically proximate to one another, such as a group of blade servers or rack mount devices in a given chassis, rack, and/or data center. In some implementations, one or more of appliances 200 of cluster 400 may be geographically distributed, with appliances 200 not physically or geographically co-located. In such implementations, geographically remote appliances may be joined by a dedicated network connection and/or VPN. In geographically distributed implementations, load balancing may also account for communications latency between geographically remote appliances.

In some implementations, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some implementations, client data plane 402 and server data plane 404 may be merged or combined into a single device.

In some implementations, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some implementations, back plane 406 may be a physical network, a VPN or tunnel, or a combination thereof.

E. Systems and Methods for an SD-WAN Application

Existing traffic routing topologies can have a limited ability to classify application traffic and apply various policies for application routing and access security. For example, existing routing topologies might not have access to technical aspects of network traffic, and instead have to rely on less accurate techniques such as traffic classification using network source and destination addresses, or traffic content inspection. The implementations described herein can provide application routing to address various types of application traffic delivery optimizations. Various other advantages are described in greater detail below.

The systems and methods for a software-defined wide area network (SD-WAN) application are described herein. More particularly, the systems and methods described herein may deploy a "soft" or "virtual" SD-WAN application on a client device.

Figure 5:
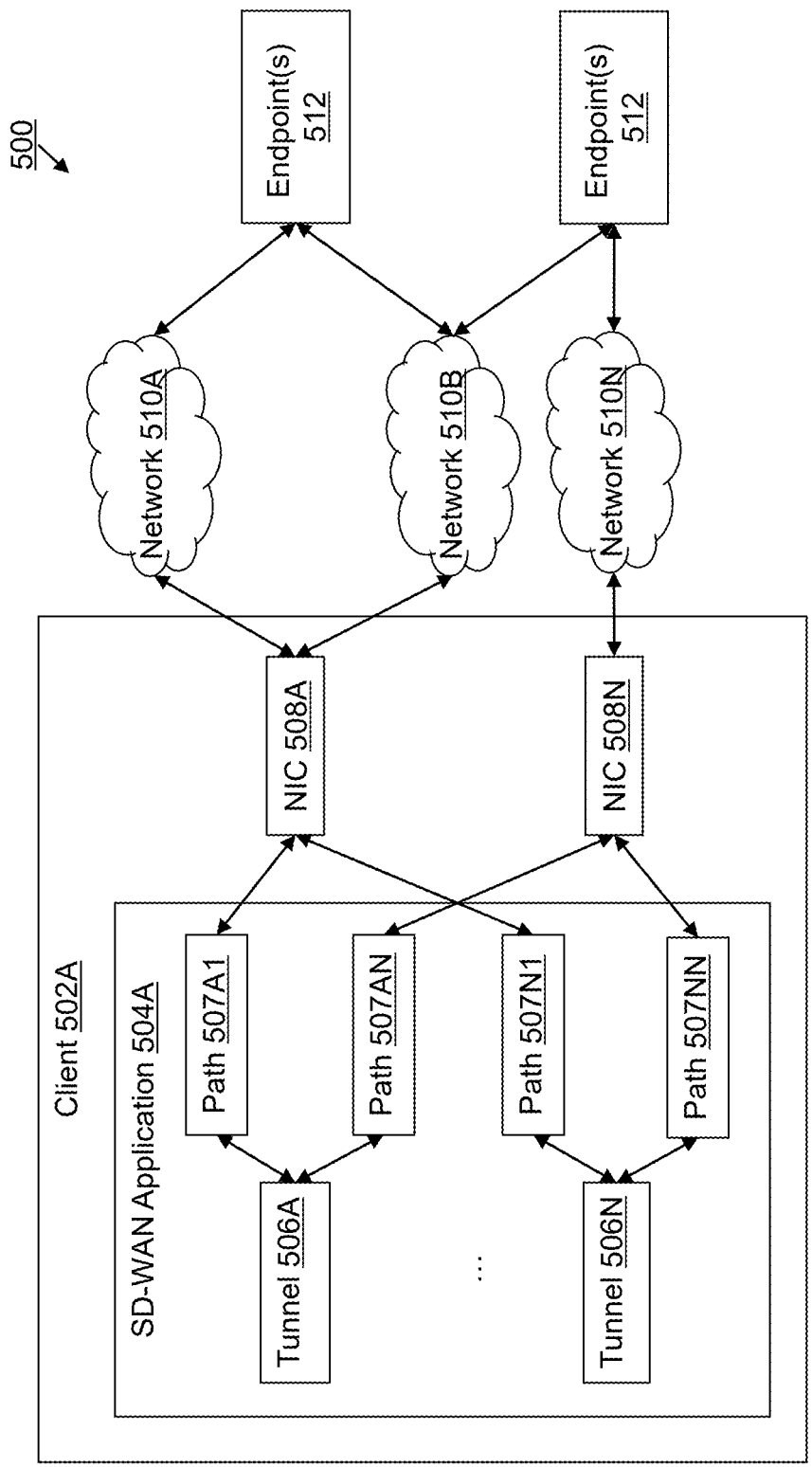
FIG. 5 is a block diagram of a system for multi-link SD-WAN, according to an illustrative implementation.

Referring now to FIG. 5, depicted is a block diagram of a system 500 for a multi-link SD-WAN, according to illustrative implementations. The system 500 is shown to include a client 502A (generally referred to as client 502) including an SD-WAN application 504A (generally referred to as SD-WAN application 504), which includes tunnels 506A-506N (generally referred to as tunnels 506) and paths 507A1-507NN (generally referred to as paths 507). The SD-WAN application can implement the tunnels 506 via one or more network interface cards (NICs) 508A-508N to connect via networks 510A-510N to endpoints 512A-512N. Some implementations may include only a single NIC. The NICs may be implemented as built-in hardware components of the client 502A, or may be implemented as external components connected to the client 502A via USB or other similar interfaces. In some implementations a cellular network device such as a mobile phone may be tethered to the client and used as a one of the NICs.

The systems and methods of the present solution may be implemented in any type or form of device, including clients, servers or appliances described above with reference to FIG. 1A-FIG. 4. For example, the client 502A may be similar in some respects to the clients 102 described above with respect to FIG. 1A-FIG. 1B. In some implementations, the client 502A may include or incorporate components and devices similar in some aspects to those described above with reference to FIG. 1C, such as a memory and/or one or more processors operatively coupled to the memory. The SD-WAN application 504A may be included as a module or library, or otherwise integrated and delivered together, with the client agent 120. The present systems and methods may be implemented in any implementations or aspects of the appliances or devices described herein.

The client 502A may be located at the client-side premises (e.g., at a home, office, etc.). The client 502A can be configured as a client-side network-capable device. The client 502A can be known as a multi-tunnel endpoint client that supports multiple virtual internet tunnels.

The client 502A can be configured to include an SD-WAN application 504A. In some implementations, the SD-WAN application 504A can be configured to communicate with SD-WAN appliances or products. The SD-WAN application 504A can be configured as an SD-WAN access point. The SD-WAN application 504A can be configured to be executed by the client 502A to provide selective communication to internet-based endpoints via different virtual internet connections. Unlike an SD-WAN appliance or device that provides SD-WAN services to a plurality of clients 502A, according to the implementations and implementations of the present solution, the SD-WAN application 504A executes on the client 502A and provides SD-WAN services for the client 502A on which it executes. For example, the SD-WAN application 504A can be distributed to (e.g., as application access client software package) or installed on (e.g., as a plugin for) the client 502A, or an application of the client (such as the workspace application/application delivery system described above with reference to FIG. 1B).

The SD-WAN application 504A can be configured to maintain or establish tunnels 506 executing or operating concurrently to network destinations (e.g., endpoints 512 as described in more detail below). The tunnels 506 can be known as virtual network tunnels that are configured to deliver application traffic in an encapsulated format to the network destinations. The SD-WAN application 504A can be configured to facilitate or maintain connections between the client 502A and various endpoints 512 through multiple internet service providers (ISPs) (generally referred to herein as networks 510). The SD-WAN application 504A can be configured to facilitate communication between the client 502A and endpoints 512 via the NICs 508 and the networks 510. For example, the client 502A may include a Wi-Fi NIC 508A which further connects to two broadband networks 510A and 510B, and a cellular NIC 508N which further connects to a single mobile network 510N. Without an SD-WAN application 504A, the client 502A would typically be limited to use only one of these networks at a time for connectivity to the endpoints 512. The SD-WAN application 504A enables the capability of connecting via more than one network 510, if available, for simultaneous network connectivity. The endpoints 512 can be remote computing devices or servers, such as enterprise servers hosting various enterprise resources, third-party servers hosting applications, websites, or other resources.

The SD-WAN application 504A can be configured to establish connections using network protocols suitable for tunnel 506 connectivity with cloud-based connection virtualization services. The SD-WAN application 504A can be configured to establish connections using automatic and policy-based choice of tunneling protocols. The SD-WAN application 504A can be configured to maintain or include one or more versions of each tunnel protocol with automatic or policy-based version negotiation.

The SD-WAN application 504A can be configured to provide or identify network protocol encryption. For example, the SD-WAN application 504A can be configured to provide encryption ciphers that are more suitable to execute on an endpoint 512. Encryption ciphers can provide an optimal tradeoff between security and connection quality versus endpoint CPU utilization or energy usage.

The SD-WAN application 504A can be configured to maintain a plurality of tunnels 506 between the SD-WAN application 504A and respective tunnel destinations (e.g., networks 510). The SD-WAN application 504A can be configured to maintain or establish tunnels 506 executing or operating concurrently from network destinations (e.g., endpoints 512). The tunnels 506 can be known as virtual network tunnels 506 that are configured to deliver application traffic in an encapsulated format to a corresponding network 510. For example, the tunnels 506 can be or include connections between the SD-WAN application 504A and physical or virtualized sites that deploy SD-WAN appliances or devices, or other endpoints 512.

The SD-WAN application 504A can be configured to use the tunnels 506 to interface with or maintain multiple physical network connections of the client 502A. For example, the SD-WAN application 504A can define tunnels 506 to utilize all or a subset of network connections of the client 502A (e.g., wired or wireless Ethernet connections, a cellular connection, etc.). As such, the SD-WAN application 504A can be configured to establish tunnels 506 to multiple endpoints 512 (e.g., destinations). Each tunnel 506 can include one or more paths 507, where each path 507 represents transmission and/or receipt of tunnel packets using a specific NIC 508 and a specific network 510. The SD-WAN application 504A can be configured so that collection of paths 507 for each tunnel 506 includes a path through every available NIC 508 and network 510, or it can be configured or operate in a mode where only a subset of possible paths 507 is used at a given time by tunnels 506.

The SD-WAN application 504A can selectively use connections through each NIC 508 and to each network 510 for transmitting network traffic based on a corresponding selection of a tunnel 506 of the SD-WAN application 504A and selection of one or more paths 507 for the tunnel 506. Each path 507 can be separately monitored for availability of bandwidth, latency, jitter (variability in packet propagation time), and/or packet loss. The SD-WAN application 504A can use different techniques for selecting paths to be used for transmitting individual packets. The SD-WAN application 504A can implement round-robin load balancing (selecting paths in a round-robin fashion), latency-aware load balancing, per-connection load balancing, per-packet load balancing, selective packet duplication (transmission of packets through multiple paths in parallel). The SD-WAN application 504A can utilize packet numbering to detect packet loss and/or implement reliable delivery through retransmissions. Upon receiving the packets, the SD-WAN application 504A can deliver or forward the packets (e.g., to the network applications) immediately or, in cases of per-packet path selection, optionally buffer the packets to achieve best effort in-order delivery. For example, the SD-WAN application 504A can select among the paths 507 for specific instances of application traffic. The SD-WAN application 504A can apply bandwidth allocation logic to achieve a desired balance between quality of service (QOS) provided to competing applications. Since the SD-WAN application 504A can identify the bandwidth available on each path 507, and thus also total available bandwidth among the paths 507 through continuous monitoring of the paths 507, the SD-WAN application 504A can utilize techniques such as packet scheduling to split this available bandwidth among multiple instances of application traffic.

According to the systems and methods of the present solution, the SD-WAN application 504A may therefore be configured to provide more dynamic selection of tunnels 506 used for routing network traffic from the client 502A to the endpoints 512 by selecting a tunnel 506 which corresponds to the connection to the endpoints 512, and more dynamic selection of all or a subset of optimal paths 507 for each tunnel 506 and the bandwidth distribution and operating mode of such paths 507.

The SD-WAN application 504A can be configured to maintain or support one or more underlying transport protocols. For example, the SD-WAN application 504A can support UDP as the preferred transport protocol and TCP fallback for the cases where UDP connectivity is not available. The SD-WAN application 504A can be configured to use TCP fallback to establish multiple parallel TCP connections. Such implementations can deal with the "head-of-line blocking" behavior of TCP and reduce overall tunnel latency. The SD-WAN application 504A can be configured to utilize TCP fallback, which is when the SD-WAN application 504A switches or modifies connections to TCP if another type of connection (e.g., UDP) is unavailable. When using TCP fallback, the SD-WAN application 504A can be configured to identify or classify individual TCP connections as virtual equivalents of "physical" connections, and thus as individual network paths 507 as defined above. The SD-WAN application 504A can be configured to apply QoS features (e.g., per-packet connection selection, packet reordering buffers, packet duplication or other forms of forward error correction) to fall back to TCP connections.

F. Systems and Methods for Selecting Tunnels for Transmitting Network Traffic by an SD-WAN Application SD-WAN appliances can maintain multiple tunnels among themselves to optimize the quality and costs of network traffic delivery. The systems and methods described herein include multi-tunnel capable endpoint clients with application classification and routing capability, supported by a collection of tunnel service Points of Presence (POPs) with distinct features. The systems and methods described herein can enable a SD-WAN application executing on a user endpoint to support multiple tunnels, and select one of the tunnels based on, for example, the application or resource being accessed at a server endpoint as described above with reference to FIG. 5.

The systems and methods described herein may enable communication between the SD-WAN application client and applications such as an application client virtualization service. The systems and methods described herein relate to identification of an application in a virtualized desktop environment (where the identity of the application is unknown to the tunnel selector), and the selection of a tunnel is based on a QoS or other application characteristics of the identified application.

According to the implementations and implementations described herein, a software-defined wide area network (SD-WAN) application executing on a client device can establish a connection between the SD-WAN application and one or more applications. The SD-WAN application can maintain a plurality of tunnels between the SD-WAN application and respective tunnel destinations (e.g., which may be used for accessing an endpoint or resource which may correspond to the one or more applications). The SD-WAN application can receive application traffic from an application of the one or more applications. The SD-WAN application can select, based on the application traffic, a respective tunnel of the plurality of tunnels via which to transmit the application traffic of the application. The SD-WAN application can transmit, by the SD-WAN application, the application traffic via the selected tunnel (e.g., to the endpoint hosting the application).

Such implementations support multiple tunnels operating concurrently from the same endpoint, which allows the endpoint to connect to multiple remote network locations (e.g., remote from the client). The tunnels may each correspond to all or a subset of network connections available to the client device. When the SD-WAN application selects a tunnel for routing network traffic to an endpoint, the SD-WAN application can receive or accept the network traffic for transmission via the tunnel of the SD-WAN application. The SD-WAN application can split the network traffic into one or more individual network paths comprising the tunnel. The SD-WAN application can transmit the network traffic via the selected path or paths to the corresponding network connections of the client device to a network, and ultimately to the endpoint, where such traffic would be recombined from the tunnel paths before getting delivered to the destination application. Such implementations of providing multiple tunnel connections to remote service locations in parallel enable clients to deliver a combination of quality, cost, and security. Various other advantages are described in greater detail below.

Figure 6:
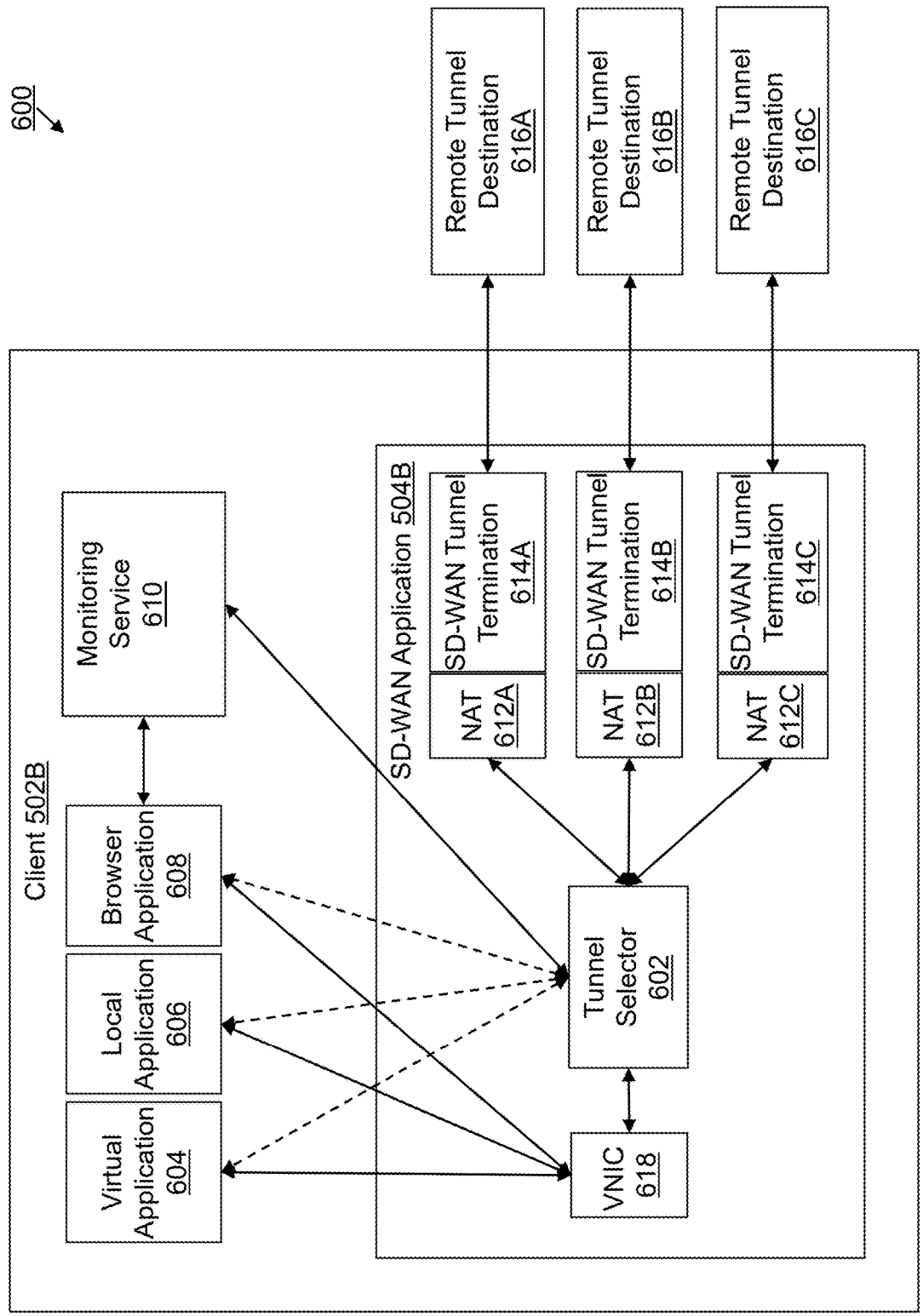
FIG. 6 is a block diagram of a system for selecting tunnels for transmitting application traffic by an SD-WAN application, in accordance with an illustrative implementation.

Referring now to FIG. 6, depicted is a block diagram of a system 600 for selecting tunnels for transmitting network traffic by an SD-WAN application, according to illustrative implementations. As a brief overview, the system 600 is shown to include the client 502B, which can be similar to and include the functionality of client 502A. The client 502B can be configured to include or otherwise access a virtual application 604, a local application 606, and/or a browser application 608. The client 502B may further include a monitoring service 610 communicably coupled to the applications 604, 606, and/or 608. The monitoring service 610 may be configured to communicate with or otherwise receive data from the application delivery service of the client 502B, from a workspace application of the client 502B, or from the web browser application hosting the browser application 608. The SD-WAN application 504B can be configured as a software-defined wide area network (SD-WAN) application executing on the client 502B (also referred to herein as a client device). The SD-WAN application 504B can be similar to and include the functionality of SD-WAN application 504A. The virtual application 604, the local application 606, and/or the browser application 608 may be configured to communicate with a virtual network interface card (such as a virtual NIC (VNIC) 618) and/or a tunnel selector 602 of the SD-WAN application 504B. The VNIC 618 may be similar to the NIC 508 described above with reference to FIG. 5. As such, the VNIC 618 may be, in some implementations, a virtualized implementation or instance of the NIC 508. The VNIC 618 may be configured to facilitate exchange of traffic between applications 604-608 and the SD-WAN application 604B. The SD-WAN application 504B can include network address translation (NAT) 612A-612C (generally referred to as NAT 612). The SD-WAN application 504B can include SD-WAN tunnel terminations 614A-614C (generally referred to as SD-WAN tunnel terminations 614). The SD-WAN tunnel terminations 614 can be communicatively coupled to the remote tunnel destinations 616A-616C (generally referred to as remote tunnel destinations 616). In some embodiments, connections between the SD-WAN tunnel terminations 614 and the remote tunnel destinations 616 may be established via one or more individual network paths (e.g., paths 507 as described above).

The systems and methods of the present solution may be implemented in any type or form of device, including clients, servers or appliances described above with reference to FIG. 1A-FIG. 5. For example, the client 502B may be similar in some respects to the clients 102 described above with respect to FIG. 1A-FIG. 1B. In some implementations, the tunnel selector 602 can include or incorporate components and devices similar in some aspects to those described above with reference to FIG. 1C, such as a memory and/or one or more processors operatively coupled to the memory. The present systems and methods may be implemented in any implementations or aspects of the appliances or devices described herein.

The SD-WAN application 504B can include a tunnel selector 602 configured to be an application-aware routing subsystem between the endpoints remote tunnel destinations 616 (e.g., endpoint 512 operating system (OS)) and local applications 604, 606, and 608. The SD-WAN application 504B can control or modify the functionality of the tunnel selector 602 through a policy mechanism in the application access client 502B and its management framework.

The tunnel selector 602 can initially be inactive without enabling any of the tunnel functionality, but at a later point in time, the tunnel selector 602 can be completely or partially activated. In some implementations, the tunnel selector 602 can be exposed to a network interface (such as the VNIC 618) with multiple tunnels 506 to remote destinations. For example, the VNIC 618 can be configured to establish a connection with the virtual application 604, the local application 606, and the browser application 608, and route traffic and/or other data/information to the tunnel selector 602. The tunnel selector 602 can be configured to maintain or identify a plurality of tunnels 506 between the SD-WAN tunnel terminations 614 and remote tunnel destinations 616. The SD-WAN application 504B can maintain or establish tunnels 506 executing or operating concurrently from the remote tunnel destinations. The tunnels 506 can be known as virtual network tunnels 506 that are configured to deliver application traffic in an encapsulated format to the network remote tunnel destinations 616 (e.g., via the NICs 508 of the client 502A as shown in FIG. 5). The tunnels 506 can maintain or facilitate connections between the SD-WAN application 504B and network connections of the client 502B via the NICs 508. The tunnel selector 602 can be configured to select connections between remote tunnel destinations 616 and the applications via the SD-WAN tunnel terminations 614, based on the traffic and data received from the VNIC 618, as described in greater detail below.

The SD-WAN application 504B can be configured to receive application traffic from an application (e.g., virtual application 604, local application 606, and/or browser application 608). For example, the SD-WAN application 504B can be configured to identify an application stack, which may include traffic which is to be sent to an endpoint 512 corresponding to the application. The SD-WAN application 504B can be configured to probe or identify the application traffic from the application stack. The SD-WAN application 504B can be configured to classify the application traffic. The SD-WAN can classify the application traffic by using one or more application classification and routing rules, as described in greater detail below. The SD-WAN application 504B can be configured to generate identifications of application correlations and dependencies for different types of application traffic using the monitoring service 610. The monitoring service 610 may be or include a browser add-on deployed at or otherwise communicably coupled to the browser application 608. The tunnel selector 602 can use these insights to select SD-WAN tunnel terminations 614 both for the virtualized SD-WAN on the client 502B or hardware SD-WAN devices.

As shown in FIG. 6, the connection between the SD-WAN application 504B and the applications 604-608 can include two sets of connections. The SD-WAN application 504B can be configured to establish or maintain communications with the applications 604-608 (e.g., an application virtualization service). A first connection can be between the SD-WAN application 504B and the VNIC 618 of the SD-WAN application 504B. A second connection can be between the VNIC 618 and the applications 604-608. The SD-WAN application 504B can be configured to receive the application traffic and/or application characteristics from the application(s) 604-608 via the VNIC 618. The application traffic can indicate characteristics of the applications 604-608. In some implementations, the application characteristics may include properties and/or state information about the applications 604-608 that would otherwise not be accessible to the SD-WAN application 504B from generic packet analysis such as identifying destination addresses. For example, the SD-WAN application 504B may use operating system APIs on the client 502B to collect application names, application vendor information, and application configuration information, for applications 604-608 running on the client 502B. The SD-WAN application 504B can use this information to map each instance of the applications 604-608 to an application class defined within the SD-WAN application 504B with its associated routing and QoS parameters. Based on the application traffic class, the tunnel selector 602 can be configured to modify application traffic routing or identify QoS.

The applications 604, 606, and 608 can include a virtualized application hosted on an endpoint 512 (e.g., accessible via the remote tunnel destinations 616). The virtualized application can enable or facilitate communications with the remote tunnel destinations 616 via the SD-WAN application 504B. The virtualized application can enable the decoupling of the remote tunnel destinations 616 (e.g., endpoint environment the computer of the application user) from the application execution environment if the application network traffic originates from unpredictable or unknown locations. The virtualized application can enable external visibility into the application execution environment, such as of uniform remote graphics for all kinds of virtualized applications or generic plugins such as browser content redirection plugins or real-time media redirection plugins that can generate application traffic on behalf of multiple virtualized applications. The virtualized application can enable rich policy mechanisms for application access that are not visible to and lack support from the SD-WAN framework.

The tunnel selector 602 can be configured to determine a network address for the application traffic. The SD-WAN tunnel terminations 614 can be associated with NAT 612. To isolate the OS and applications from IP addressing details of multiple tunnels 506, the SD-WAN application 504B can expose the SD-WAN tunnel termination 614 (e.g., network connectivity) by using or generating the NAT 612 (e.g., client-local private IP on the OS-facing side). The SD-WAN application 504B can generate automatic NAT 612 between IP and remote tunnels destinations 616.

The tunnel selector 602 can be configured to classify or identify SD-WAN traffic. The classification abilities can include rulesets for matching specific network transport addresses of DNS names. The classification abilities can include built-in or remotely hosted URL classification databases. The classification abilities can include deep packet inspection (DPI) capabilities, such examining and managing network by using packet filtering that locates, identifies, classifies, and reroutes or blocks packets with specific data or code payloads.

The tunnel selector 602 can be configured to detect or identify URLs of content delivery networks (CDNs) that host content specific to the current application. Even if CDN URLs are not transparent with regard to their usage (i.e., it is often not possible to determine which application the hosted content pertains to from the URL), the tunnel selector 602 can be configured to identify or monitor that the CDN-hosted content is being accessed from a particular top-level application page to provide an association between that content URL and the applications 604-608. Based on the association between the content URL and the applications, the SD-WAN application 504B can be configured to enable or provide a differentiated level of service for that URL. For example, the SD-WAN application 504B can provide higher throughput or security bypass.

The tunnel selector 602 can be configured to maintain application classification and routing rules for the application traffic. Routing rules pertaining to the tunnels 506 can include connection quality (latency, throughput) and resource availability at the tunnel destination (bandwidth, CPU, service nodes, in service versus maintenance status). The SD-WAN application 504B can be configured to modify or change the routing rules dynamically over time (e.g., based on user feedback, based on feedback or modified settings received from an administrator computing device, etc.), and cause the tunnel selector 602 to change its behavior accordingly while maintaining uninterrupted connectivity between the applications 604, 606, 608 and the remote tunnel destinations 616.

The tunnel selector 602 can be configured to receive the metrics for the virtualized application from at least one of an application delivery service of the client 502B, a workspace application of the client 502B, or the endpoint 512. The monitoring service 610 can share information about virtualized applications with the SD-WAN application 504B. For example, the monitoring service 610 can share service-to-service data relating to metrics of resources accessed via the monitoring service 610. The management layer of the monitoring service 610 can transmit, to the SD-WAN application 504B, information about applications that are managed through this framework, including semantic application tagging, network locations where the applications are deployed, and any application delivery policies that are relevant for the SD-WAN application 504B, such as the requirements to support browser content redirection or real-time media redirection. In another example, the monitoring service 610 can share client-to-endpoint data relating to metrics of resources accessed via the monitoring service 610. The client-to-endpoint data can include software development kit (SDK) related messages shared between the clients and endpoints relating to virtualized application usage.

The tunnel selector 602 can be configured to receive metrics for the virtualized applications 604. The tunnel selector 602 can be configured to retrieve metrics from the application virtualization servers (VDAs) and endpoints or remote tunnel destinations 616. The tunnel selector 602 can be configured to receive the metrics over the network using in-band or out-of-band network signaling protocols. The tunnel selector 602 can be configured to facilitate metadata information exchange (e.g., instead of using a network protocol) on the endpoint between the SD-WAN application 504B and its NIC 618 (e.g., embedded network engines), and the applications 604, 606, 608 running on the same client 502B using local APIs (e.g., instead of network protocols). The tunnel selector 602 can avoid reliance on implicit policy definitions for application routing within the SD-WAN application 504B. Rather, the tunnel selector 602 may rely on application metadata exported by the monitoring service 610. The tunnel selector 602 can configured to maintain or provide more explicit quality of service or routing policies defined in the monitoring service 610 and exported to the SD-WAN application 504B.

The tunnel selector 602 can be configured to receive metrics for the browser application traffic from a monitoring service 610 of the client 502B. The tunnel selector 602 can be configured to include, provide, or implement application-specific monitoring tools to classify web browser traffic originated by specific browser application 608 instances (e.g., windows, tabs, web worker processes). For example, the tunnel selector 602 can be configured to implement browser add-ons or other introspection mechanisms (such as an accessibility API). In another example, the tunnel selector 602 can be configured to associate related applications 604, 606, 608, such as parent and child processes, performing related network access. For non-browser applications, the tunnel selector 602 can be configured to monitor or identify traffic generation by an application process over its lifetime. The SD-WAN application 504B can associate traffic generated by child processes with their parent application processes.

The monitoring service 610 can include a service executing on a browser application 608 of the client 502B via which the application traffic is received. An add-on installed within a browser can collect and supply the tunnel selector 602 (and through it, the broader SD-WAN service framework) with information or data. The information can include the collection of web services (sites) providing content embedded in, or dynamically accessed from, a particular top-level application page (or URL). The information can include the sequence of automatic or service-initiated transitions (redirections) between different top-level application pages that the browser and user go through in the course of accessing a particular website. For non-browser applications, additional information can identify non-browser services being accessed by the applications 604, 606, 608.

The monitoring service 610 can be configured to monitor or identify the application traffic of the applications 604, 606, 608, and associated traffic of services corresponding to the applications 604, 606, 608. The tunnel selector 602 can be configured to identify or obtain application access information from applications, such as applications 604, 606, and 608, which provide access to a managed application framework with a set of "virtual" applications. Such applications accessed by the clients can be designed to export information about the current "virtual" application or applications 604-608 being accessed by the user ("application access information"), through an SDK or another suitable mechanism, to the tunnel selector 602. The tunnel selector 602 can then use this information to classify network packet flows for specific applications.

The application access information may include a time-based association between network packet flows and virtual applications. For example, when the user accesses a virtual desktop and switches to a different virtual application 604, the remote graphics packet flow can be reclassified as pertaining to the virtual application 604 that the user is currently accessing. To utilize this information, the tunnel selector 602 can be configured to identify or classify the same network flow differently at different times. The application access information can be complemented by more metadata about the user or applications that comes from the managed application framework, including desired QoS parameters for specific virtual application 604 traffic, or supplying inputs into policy-based routing, e.g., by describing the current user session or a specific virtual application 604 as more or less trustworthy and requiring the corresponding level of security enforcement.

The tunnel selector 602 can be configured to identify or generate SD-WAN traffic classifications. The classifications can be based on rulesets for matching specific network transport addresses of DNS names. The classification can be based on built-in or remotely hosted URL classification databases. The SD-WAN application 504B can identify or generate classifications by using DPI capabilities.

The tunnel selector 602 can be configured to communicate with the application access framework. The application access framework can transmit, share, send, or otherwise provide the tunnel selector 602 with the application traffic. In one example, the tunnel selector 602 can be configured to monitor or identify the application traffic shared by the application access framework to identify which virtual application 604, 606, 608 is currently being used, and receive reports about the user switching to a different application in real time. The tunnel selector 602 can be configured to monitor or identify such events to dynamically reclassify the application traffic streams. For example, the tunnel selector 602 can be configured to classify the remote graphics packet flow as about the virtual application 604 that the user is currently accessing. By modifying or updating the classification, the tunnel selector 602 can be configured to dynamically change the quality of service and other parameters of its functionality.

The tunnel selector 602 can be configured to monitor or identify application traffic exported by the application access framework that includes policy or security metadata. The tunnel selector 602 can be configured to utilize the application as one of the inputs for application traffic routing. For example, the tunnel selector 602 can be configured to identify applications 604-608 reported as less trustworthy, and route its browser content to a corresponding remote tunnel destination 616 (e.g., POP with a security service). In another example, the tunnel selector 602 can be configured to identify a more trusted application of the applications 604-608 and provide or grant more access for its redirected browser content.

The tunnel selector 602 can be configured to generate application traffic classifications. For example, the tunnel selector 602 can be configured to classify network traffic for each application 604, 606, 608. The tunnel selector 602 can be configured to identify the application 604, 606, 608 that generated, originated, or accepted a specific network flow or a transaction. For example, the tunnel selector 602 can be configured to detect or identify the application 604, 606, 608 that generated a DNS request.

The tunnel selector 602 can be configured to associate or identify multiple network flows originating from or accepted by a respective application 604-608. The tunnel selector 602 can be configured to differentiate among multiple network flows originating from or accepted by the respective application 604, 606, 608. For example, the tunnel selector 602 can be configured to differentiate among multiple network flows for the browser application 608 that is providing access to multiple user applications.

The tunnel selector 602 can be configured to detect and classify shared services. The tunnel selector 602 can be configured to classify shared services for detection and classification of similar third-party services. The tunnel selector 602 can be configured to collect or identify information about web applications' usage of specific third-party services. The tunnel selector 602 can be configured to correlate this information across multiple applications 604, 606, and 608. The tunnel selector 602 can be configured to correlate applications 604, 606, and 608, which can be faster and more comprehensive than providing information about service dependencies to a centralized data processing service. Once a service is identified as a multi-tenant service, the tunnel selector 602 can be configured to classify the service as such. Based on the classification, the tunnel selector 602 can be configured to provide unbundled traffic accounting (assigning shared service traffic to its own bucket for monitoring and analytics purposes) and differentiated application traffic delivery services to the applications 604-608 associated with the received service traffic. Such differentiated services can range from higher quality of service to lower quality, including best-effort non-tunnel traffic delivery, or complete blocking of shared services that are deemed harmful or unnecessary.

A multi-tunnel SD-WAN application 504B can be configured to maintain tunnels 506 to both endpoints 512, classify the applications 604-608 regarding their security requirements, determine which set of services (general purpose internet connectivity or connectivity with a layer of security) is required for each application, and use the corresponding tunnel for traffic of that application.

The tunnel selector 602 can be configured to identify endpoints 512 with which to establish or maintain connections or tunnels 506. The endpoints 512 can be implemented as a service or a set of services providing connectivity and computing resources shared by multiple service consumers, and known as SD-WAN cloud points of presence or POPs. The endpoints 512 can include general purpose cloud POPs for improved internet connectivity. The endpoints 512 can include POPs that provide security services, such as content filtering, malware scanning, etc. Such services may be available directly in the service POP, or may be delivered by forwarding the traffic from the remote tunnel destination to the relevant security service. The endpoints 512 can be associated with the remote tunnel destinations 616 located in a specific geographic areas to provide localized connectivity services with low access latency, or to ensure traffic routing through, or customer data residency in, a specific jurisdiction. The endpoint 512 can include POPs located near, or collocated with, specific SaaS applications that provide improved connectivity to those applications. The endpoint 512 can include POPs located in public clouds that provide improved connectivity to those specific public clouds. The endpoint 512 can include POPs that provide direct VPN-like connectivity to private networks.

The endpoints 512 can include POPs (e.g., SD-WAN cloud service POPs) that provide indirect ("Zero Touch Network Access") connectivity to private networks 510, by routing application network through an additional intermediary service (reverse proxy, access gateway). The endpoints 512 can include a network implementation of a ZTNA POP that includes the chaining of one or more of the following network elements, all of which can be hosted in the endpoint 512: a tunnel "headend" implementing tunnel connections from tunnel clients 502B, a proxy or a gateway serving as an intermediary, and a second tunnel "headend" implementing tunnel connections with private networks. The SD-WAN application 504B can be configured to provide, maintain, or establish VPN connectivity to the proxy or gateway hosted in the endpoint 512. In some implementations, the endpoint 512 can prevent or prohibit connectivity to resources on a private network.

The endpoints 512 can be implemented as connectivity and computing resources dedicated to a specific resource consumer, known as site POPs. The endpoints 512 can include compatible physical or virtual SD-WAN appliances capable of accepting client connections from the SD-WAN application 504B. The endpoint 512 can be owned and managed by a service, or owned by service customers and completely or partially managed by the service. The endpoint 512 can include cloud or site POPs that provide access to specific virtualized or managed applications 604-608. The monitoring service 610 can be configured to maintain associations between POPs and virtualized or managed applications 604-608 and share them with the tunnel selector 602. The SD-WAN application 504 can be configured to manage or provide indirect management or discovery and association functionality for site SD-WAN appliances in local networks 510 where endpoints 512 may be located (e.g., remote tunnel destinations 616). For example, the appliances in such networks 510 might not connect via tunnels 506, but instead provide their own tunnels 506 or other means of application traffic handling that completely or partially supersede the functionality of the SD-WAN application 504B and endpoint 512.

The tunnel selector 602 can be configured to determine network conditions of the tunnels 506. The tunnel selector 602 can be configured to collect information about the remote tunnel destination 616 and its network environment, as well as availability and current state of network paths 507 leading to that tunnel destination 616. The tunnel selector 602 can collect the geographic location of the remote tunnel destination 616. The tunnel selector 602 can identify whether the classification of the location is more or less trusted.

The tunnel selector 602 can be configured to detect or identify failed network access attempts to remote tunnel destinations 616. The tunnel selector 602 can be configured to detect or identify failed network access attempts that were made by the application for reasons not known to the tunnel selector 602. The tunnel selector 602 can be configured to use failed access attempts to troubleshoot and enable access to services that are required but blocked by mistake. The tunnel selector 602 can be configured to use the failing access attempts to detect unapproved or malicious activity from a known or approved application 604, 606, 608, which may indicate that the application 604-608 has been compromised.

The tunnel selector 602 can be configured to enable the applications 604-608 to access a specific intermediary service available at a remote tunnel destination 616. Service examples can include transparent (e.g., "bump in the wire") security services, application proxies, file caches or WAN accelerators, media relay services, etc. The tunnel selector 602 can be configured to associate a NAT 612 to a specific public IP or IP range assigned to a remote tunnel destination 616. For example, the tunnel selector 602 can be configured to generate a respective NAT 612 for each SD-WAN tunnel termination.

The tunnel selector 602 can be configured to manage application 604-608 access to each remote tunnel destination 616 that is located in or remote to the SD-WAN application 504B. The tunnel selector 602 can be configured to provide direct access to remote tunnel destinations 616 such as a specific allocation in a public cloud (such as Azure or AWS). The tunnel selector 602 can be configured to classify or identify the public cloud based on its cloud location or access to a generic Internet location. For example, if the destination is a cloud location associated with a particular application, then the tunnel selector 602 can be configured to classify or identify the application.

The monitoring service 610 can be configured to assign the applications to a respective tunnel 506 according to the monitored application traffic. The tunnel selector 602 can be configured to use application classifiers and routing rules for matching applications 604-608 to remote tunnel destinations 616. For example, the SD-WAN can require application access to an end service accessible only through a tunnel 506. The applications 604-608 and the end services they access may be described and classified in semantic terms (e.g., "self-hosted VOIP," "virtual desktops," "file servers," or any generic tagging) with or without network addressing information used for traditional routing.

The tunnel selector 602 can be configured to select a respective tunnel 506 via which to transmit the application traffic of the applications 604-608. The tunnel selector 602 can be configured to select the respective tunnel 506 based on applying the application classification to the application classification and routing rules. The tunnel selector 602 can be configured to select the respective tunnel 506 based on a mapping of the NAT 612 to the respective tunnel 506 of the plurality of tunnels 506. The tunnel selector 602 can be configured to select the respective tunnel 506 based on the metrics received from the monitoring service 610. The tunnel selector 602 can be configured to select the respective tunnel 506 based on the network conditions of the plurality of tunnels 506. The tunnel selector 602 can be configured to select the respective tunnel based on the metrics for the virtualized application. As part of tunnel selection, the tunnel selector 602 can be configured to select how the tunnel 506 should treat this specific instance of application traffic based on desired QoS characteristics, including the desired details of bandwidth allocation and path selection.

The tunnel selector 602 can be configured to optimize a cost versus quality tradeoff based on a location of the endpoint 512. For example, two endpoints 512 can be located within a short network distance from the client 502B that includes the SD-WAN application 504B. One of the endpoints 512 can be hosted in a public cloud, and all traffic originating from this endpoint 512 can incur traffic charges specific to that public cloud, which can be relatively high. On the other hand, the public cloud endpoints 512 can include direct high-quality connections to applications 604-608 that are hosted in the same public cloud and do not incur any additional charges for traffic to destinations in this public cloud. Another endpoint 512 can be hosted in a colocation facility or internet exchange where general traffic charges may be lower. Thus, it can be suitable for the SD-WAN application 504B to tunnel most application traffic. For traffic going to the public cloud of the first endpoint 512, however, usage of the endpoint 512 can require a separate network hop (and thus higher latency), as well as additional traffic costs (since traffic can be billed twice, once by the colocation facility or internet exchange provider, and once by the public cloud).

The SD-tunnel selector 602 can be configured to identify the endpoints 512 to be described in the configuration and policy framework as being hosted in a particular environment (such as a specific public cloud) or having a particular preference value based on cost of carrying application traffic. The tunnel selector 602 can be configured to select, maintain, or establish tunnels 506 to both endpoints 512, classify applications 604-608 according to the specific public cloud compared to generic internet destination of their traffic, decide which tunnel to use for each application depending on application classification, and route the application traffic to and from the chosen tunnel 506.

Application routing can address a dynamic quality tradeoff. For example, if two or more endpoints 512 are located within similar network distance from the SD-WAN application 504B, one of the endpoints 512 may temporarily experience a comparatively higher level of load resulting in degraded level of service. The tunnel selector 602 can have the ability to select or maintain tunnels 506 to both overloaded and under-loaded endpoints 512, receive information about their load level, and dynamically switch some or all application traffic to a less loaded endpoint 512 to maintain optimal quality of application traffic delivery. As the overloading state is dynamic in nature, the previously overloaded endpoint 512 can over time become more available, causing the SD-WAN application 504B to shift the traffic by selecting tunnels 506 back to maintain load balancing. Both shifts can occur transparently to the end user since the SD-WAN application 504B can maintain both tunnels 506 up and active during the dynamic transition.

In another example of dynamic quality tradeoff, connection between the SD-WAN application 504B and one of the endpoints 512 can temporarily deteriorate, for example, due to global disruptions of traffic routing. The SD-WAN application 504B can be configured to maintain tunnels 506 to endpoints 512 with currently better and currently worse connectivity, and the tunnel selector 602 can select tunnels 506 to shift application traffic to the endpoints 512 with better access.

Application routing can address a tradeoff between security versus quality and cost. The SD-WAN application 504B can be configured to provide security services, such as content filtering or malware scanning, within a particular service endpoint 512 or in proximity to that service endpoint 512. For a given SD-WAN application 504B, the endpoint 512 can provide the security services required for that SD-WAN application 504B and a particular set of applications to follow the enterprise security policy. Usage of these security services may be associated with a higher cost of service (since they may use premium computing or network resources or be generally in higher demand). At the same time, the same SD-WAN application 504B can be configured to identify another endpoint 512 that is available in closer network proximity to the SD-WAN application 504B than the security-enabled endpoint 512. This closer endpoint 512 can then be preferred for any application traffic that does not require the security services.

The SD-WAN application 504B can facilitate source IP anchoring. In a similar configuration with two endpoints 512, one more remote and one more local, the more remote endpoint 512 may be configured with a static IP or a static IP range suitable for accessing a particular application (as that application may implement access control by requiring all user access to come from a known set of source IP addresses). The endpoint 512 that is closer can still be preferred for other application traffic due to proximity and higher availability. A multi-tunnel client 502B can maintain tunnels 506 to both endpoints 512 and would send application traffic requiring a particular source IP to the remote endpoint 512 hosting that IP, and other application traffic to the closer endpoints 512.

The tunnel selector 602 can be configured to select the respective tunnel based on the application traffic. The tunnel selector 602 can be configured to route network traffic based on routing rules outside of network packet parameters (such as the source and destination IP addresses and ports) to provide better network quality of service and better user experience, and/or to address application-specific security requirements. The routing rules can be assigned to applications based on application classification and match application flows with specific remote tunnel destinations 616.

The tunnel selector 602 can be configured to implement rules to route application traffic flows matching certain security-related rules, or not matching any rules, to one of the tunnels 506 leading to endpoint 512 that provide security services (content filtering, malware scanning, etc.). The tunnel selector 602 can be configured to implement rules to route application traffic flows matching certain location or jurisdiction-related rules, or not matching any rules, to one of the tunnels 506 leading to endpoint 512 located in a specific geographic area. The tunnel selector 602 can be configured to implement rules to route application traffic flows to or from a specific SaaS application to one of the tunnels 506 leading to endpoint 512 located near, or collocated with, that specific SaaS application.

The tunnel selector 602 can be configured to implement rules to route application traffic flows to or from a specific public cloud to one of the tunnels 506 leading to endpoint 512 located in that specific public cloud. The tunnel selector 602 can be configured to implement rules to route application traffic flows for applications located in a private network to one of the tunnels 506 leading to endpoint 512 that provide direct VPN-like connectivity to that private network. The tunnel selector 602 can be configured to implement rules to route application traffic flows for applications located in a private network to one of the tunnels 506 leading to endpoints 512 that provide indirect ("Zero Touch Network Access") connectivity to that private network.

The tunnel selector 602 can be configured to implement rules to route application traffic flows to different cloud endpoint 512 sites based on the distinction between physical applications (installed or executed locally on the endpoint 512) and virtual applications (accessed through an application virtualization framework). The tunnel selector 602 can be configured to implement rules to route application traffic flows to different endpoints 512 in the cloud based on individual virtual or managed applications 604-608 being hosted at or accessible through specific endpoints 512. The tunnel selector 602 can be configured to implement rules to route application traffic flows to different endpoints 512 in the cloud or SD-WAN sites based on applications that are unmanaged (self-installed) versus managed (sanctioned and/or delivered through the application management framework). The tunnel selector 602 can implement rules to route application traffic flows to different endpoints 512 in the cloud based on other metadata about applications that may be supplied by the managed application client 502.

The tunnel selector 602 can be configured to transmit the application traffic via the selected tunnel 506. The tunnel selector 602 may be configured to transmit the application traffic to the endpoint 512 by transmitting the traffic on the tunnel 506 to the corresponding network connection to the endpoint 512.

The tunnel selector 602 can be configured to modify or influence the usage of individual network paths 507 comprising the tunnel 506 for conveying the application traffic. For example, the tunnel selector 602 can be configured to identify that some applications 604-608 can be deemed eligible for enhanced reliability at the expense of additional network bandwidth usage, and the tunnel selector 602 can be configured to establish duplicate transmission of application network packets through multiple parallel paths 507 for the identified applications 604-608. In another example, the tunnel selector 602 can be configured to identify that the applications 604-608 are known to be more sensitive to in-order packet delivery but less sensitive to latency, and the tunnel selector 602 can be configured to establish a persistent path 507 as opposed to frequent path switching for load balancing or latency management for the identified applications 604-608.

By switching among the tunnels 506 and paths 507 between the SD-WAN application 504 and the endpoints 512, the tunnel selector 602 can enable a more secure, mediated access mode for accessing enterprise-internal resources ("Zero Touch Network Access," or "ZTNA"), by including an integrated application proxy capability in the SD-WAN path 507 (e.g., when the tunnel selector 602 routes to the endpoints 512). In addition to being considerably more secure than the traditional VPN access, this SD-WAN-based ZTNA approach can remove the need to deploy application-specific "connectors" in private resource locations, thus functionally replacing them with a generic SD-WAN connection between the remote tunnel destination 616 and the private resource network location.

Figure 7:
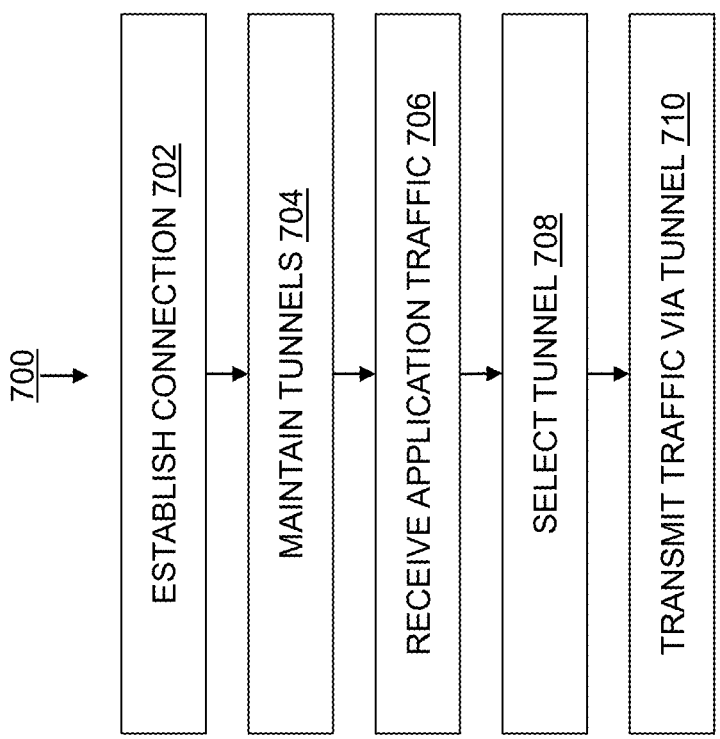
FIG. 7 is a flow diagram of a method for selecting tunnels for transmitting application traffic by an SD-WAN application, in accordance with an illustrative implementation.

Referring to FIG. 7, depicted is a flow diagram of a method 700 for selecting tunnels for transmitting application traffic by an SD-WAN application, in accordance with an illustrative implementation. The method 700 (including various steps included therein) may be implemented by one or more of the components shown in FIGS. 5 and 6 as described above, such as the client 502, SD-WAN application 504, etc. As a brief overview, at step 702, a SD-WAN application establishes a connection. At step 704, the SD-WAN application can maintain tunnels. At step 706, the SD-WAN application can receive application traffic. At step 708, the SD-WAN application can select a tunnel. At step 710, the SD-WAN application can transmit traffic via the tunnel.

At step 702, a SD-WAN application (e.g., SD-WAN application 504) can establish a connection. The SD-WAN application can be an application-aware routing subsystem between the endpoints remote tunnel destinations (e.g., endpoint operating system (OS)) and local applications. The SD-WAN application can control or modify the functionality of the tunnel selector through a policy mechanism in the application access client and its management framework.

The SD-WAN application can initially be inactive without enabling any of the tunnel functionality, but at a later point in time, the SD-WAN application can be completely or partially activated. In some implementations, the SD-WAN application can be exposed to a virtual network interface card (VNIC) (such as the VNIC 618) with multiple tunnels to remote destinations. For example, the VNIC can establish a connection with the virtual application, the local application, and the browser application, and route traffic and/or other data/information to the tunnel selector. The tunnel selector can maintain or identify a plurality of tunnels between the SD-WAN tunnel terminations (e.g., SD-WAN tunnel terminations 614) and remote tunnel destinations (e.g., remote tunnel destinations 616). The SD-WAN application can maintain or establish tunnels executing or operating concurrently from the remote tunnel destinations. The tunnels can be known as virtual network tunnels that are configured to deliver application traffic in an encapsulated format to the network remote tunnel destinations (e.g., via the NICs 508 of the client 502A as shown in FIG. 5). The tunnels can maintain or facilitate connections between the SD-WAN application and network connections of the client via the NICs. The SD-WAN application can select connections between remote tunnel destinations and the applications via the SD-WAN tunnel terminations, based on the traffic and data received from the VNIC, as described in greater detail below.

At step 704, the SD-WAN application can maintain tunnels. The SD-WAN application can maintain a plurality of tunnels between the SD-WAN application and respective tunnel destinations. The SD-WAN application can maintain or establish tunnels executing or operating concurrently from network destinations (e.g., endpoints). The tunnels can be known as virtual network tunnels that are configured to deliver application traffic in an encapsulated format to the network destinations (e.g., via the NICs 508 of the client 502 as shown in FIG. 5). The tunnels can maintain or facilitate connections between the SD-WAN application and network connections of the client via the NIC.

The SD-WAN application can utilize TCP fallback, which is when the SD-WAN application switches or modifies connections to TCP if another type of connection (e.g., UDP) is unavailable. When using TCP fallback, the SD-WAN application can identify or classify individual TCP connections as virtual equivalents of "physical" connections. The SD-WAN application can apply QoS features (e.g., per-packet connection selection, packet reordering buffers, packet duplication or other forms of forward error correction) to fall back to TCP connections.

At step 706, the SD-WAN can receive application traffic. The SD-WAN application can receive application traffic from an application. For example, the SD-WAN application can identify an application stack, which may include traffic that is to be sent to an endpoint corresponding to the application. The SD-WAN application can probe or identify the application traffic from the application stack. The SD-WAN application can classify the application traffic. The SD-WAN can classify the application traffic by using a browser add-on or general application monitoring. The SD-WAN application can generate identifications of application correlations and dependencies for different types of application traffic using the monitoring service (e.g., monitoring service 610). The monitoring service may be or include a browser add-on deployed at or otherwise communicably coupled to the browser application (e.g., browser application 608). The tunnel selector can use these insights to select SD-WAN tunnel terminations both for the virtualized SD-WAN on the client or hardware SD-WAN devices.

The connection between the SD-WAN application and the applications (e.g., applications 604, 606, and 608) can maintain two sets of connections. The SD-WAN application can establish or maintain (e.g., via an application virtualization framework) communications with the applications (e.g., an application virtualization service). A first connection can be between the SD-WAN application and the VNIC of the SD-WAN application. A second connection can be between the VNIC and the applications (e.g., applications 604, 606, and 608). The SD-WAN application can receive the application traffic from the application(s) via the VNIC. The application traffic can indicate characteristics of the application. In some implementations, the application characteristics may include properties and/or state information about the applications that would otherwise not be accessible to the SD-WAN application from generic packet analysis (such as identifying destination addresses). Based on the application traffic, the SD-WAN application can modify application traffic routing, as described in greater detail below. For example, the SD-WAN application may use operating system APIs on the client to collect application names, application vendor information, and application configuration information, for applications running on the same client. The SD-WAN application can use this information to map each instance of the applications to an application class defined within the SD-WAN application with its associated routing and QoS parameters. Based on the application traffic class, the SD-WAN application can modify application traffic routing or identify QoS.

The application can include a virtualized application hosted on an endpoint (e.g., accessible via the remote tunnel destinations 616). The virtualized application can enable or facilitate communications with the remote tunnel destinations via the SD-WAN application. The virtualized application can enable the decoupling of the remote tunnel destinations (e.g., endpoint environment the computer of the application user) from the application execution environment if the application network traffic originates from unpredictable or unknown locations. The virtualized application can enable external visibility into the application execution environment, such as of uniform remote graphics for different kinds of virtualized applications or generic plugins such as browser content redirection plugins or real-time media redirection plugins that can generate application traffic on behalf of multiple virtualized applications. The virtualized application can enable rich policy mechanisms for application access that are not visible to and lack support from the SD-WAN framework.

The SD-WAN application can provide service integration with an application virtualization service. The application virtualization service can decouple the remote tunnel destinations (e.g., endpoint environment or the computer of the application user) from the application execution environment, if the application network traffic originates from unpredictable or unknown locations. The application virtualization services can prevent external visibility into the application execution environment, by using uniform remote graphics for all kinds of virtualized applications, or by having generic plugins such as browser content redirection plugins or real-time media redirection plugins that can generate application traffic on behalf of multiple virtualized applications. The application virtualization services can provide rich policy mechanisms for application access that are not visible to and lack support from the SD-WAN framework.

The SD-WAN application can determine a network address for the application traffic. The SD-WAN tunnel terminations can be associated with NAT. To isolate the OS and applications from IP addressing details of multiple tunnels, the SD-WAN application can expose the SD-WAN tunnel terminations (e.g., network connectivity) by using or generating the NAT (e.g., client-local private IP on the OS-facing side). The SD-WAN application can generate automatic NAT between IP and remote tunnels destinations.

The SD-WAN application can classify or identify SD-WAN traffic. The classification abilities can include rulesets for matching specific network transport addresses of DNS names. The classification abilities can include built-in or remotely hosted URL classification databases. The classification abilities can include deep packet inspection (DPI) capabilities, such examining and managing network by using packet filtering that locates, identifies, classifies, and reroutes or blocks packets with specific data or code payloads.

The SD-WAN application can detect or identify URLs of content delivery networks (CDNs) that host content specific to the current application. Even if CDN URLs are not transparent with regard to their usage (i.e., it is often not possible to determine which application the hosted content pertains to from the URL), the SD-WAN application can identify or monitor that the CDN-hosted content is being accessed from a particular top-level application page to provide an association between that content URL and the applications. Based on the association between the content URL and the applications, the SD-WAN application can provide a differentiated level of service for that URL. For example, the SD-WAN application can provide higher throughput or security bypass.

The SD-WAN application can maintain application classification and routing rules for the application traffic. Routing rules pertaining to tunnels can include connection quality (latency, throughput) and resource availability at the tunnel destination (bandwidth, CPU, service nodes, in service versus maintenance status). The SD-WAN application can change the routing rules dynamically over time and cause the routing module to change its behavior accordingly while maintaining uninterrupted connectivity for endpoint applications. The SD-WAN can control the tunnel client functionality through a policy mechanism in the application access client and its management framework. For example, the SD-WAN application can distribute the tunnel client plugin as part of an application access client software package without enabling any of the tunnel functionality, and completely or partially activate or deactivate it at a later point in time. The tunnel client can be packaged as a module (or plug-in) intended for distribution as part of an integrated application access client.

The SD-WAN application can receive the metrics for the virtualized application from at least one of an application delivery service of the client device (e.g., client 502), a workspace application (e.g., SD-WAN application 504) of the client device, or the endpoint (e.g., remote tunnel destination 616). The monitoring service can share information about virtualized applications with the SD-WAN system. For example, the monitoring service can share service-to-service data relating to metrics of resources accessed via the monitoring service. The management layer of the monitoring service can transmit, to the SD-WAN application, information about applications that are managed through this framework, including semantic application tagging, network locations where the applications are deployed, and any application delivery policies that are relevant for the SD-WAN application, such as the requirements to support browser content redirection or real-time media redirection. In another example, the monitoring service can share client-to-endpoint data relating to metrics of resources accessed via the monitoring service. The client-to-endpoint data can include software development kit (SDK) related messages shared between the clients and endpoints relating to virtualized application usage.

The SD-WAN application can receive metrics for the virtualized application. The SD-WAN application can retrieve metrics from the application virtualization servers (VDAs) and endpoints. The SD-WAN application can receive the metrics over the network using in-band or out-of-band network signaling protocols. The SD-WAN application can facilitate metadata information exchange (e.g., instead of using a network protocol) on the endpoint between the virtualization client and/or its embedded network engines, and a software SD-WAN application running on the same endpoint by using local APIs (e.g., instead of network protocols). The SD-WAN application can avoid reliance on implicit policy definitions for application routing within the SD-WAN application. Rather, the SD-WAN application may rely on application metadata exported by the monitoring service. The SD-WAN application can maintain or provide more explicit quality of service or routing policies defined in the monitoring service and exported to the SD-WAN system.

The SD-WAN application can receive metrics for the application traffic from a monitoring service of the client device. The SD-WAN application can include, provide, or implement application-specific monitoring tools to classify web browser traffic originated by specific browser application instances (e.g., windows, tabs, web worker processes). For example, the SD-WAN application can implement browser add-ons or other introspection mechanisms (such as an accessibility API). In another example, the SD-WAN application can associate related applications, such as parent and child processes, performing related network access. For non-browser applications, the SD-WAN application can monitor or identify traffic generation by an application process over its lifetime. The SD-WAN application can associate traffic generated by child processes with their parent application processes.

The monitoring service can include a service executing on a browser application of the client device via which the application traffic is received. An add-on installed within a browser can collect, and supply to an SD-WAN client (and through it, the broader SD-WAN service framework) with information or data. The information can include the collection of web services (sites) providing content embedded in, or dynamically accessed from, a particular top-level application page (or URL). The information can include the sequence of automatic or service-initiated transitions (redirections) between different top-level application pages that the browser and user go through in the course of accessing a particular website. For non-browser applications, additional information can include the collection of non-browser services being accessed by the application.

The monitoring service can monitor the application traffic of the applications and associated traffic of services corresponding to the applications. The SD-WAN application obtains or identifies application access information from applications (e.g., applications 604, 606, and 608), which provide access to a managed application framework with a set of "virtual" applications. Such applications accessed by the clients can be designed to export information about the current "virtual" application or applications being accessed by the user ("application access information"), through an SDK or another suitable mechanism, to the SD-WAN application. The SD-WAN application can then use this information to classify network packet flows for specific applications.

The application access information may include a time-based association between network packet flows and virtual applications. For example, when the user accesses a virtual desktop and switches to a different virtual application, the remote graphics packet flow can be reclassified as pertaining to the virtual application that the user is currently accessing. To utilize this information, the SD-WAN application can classify the same network flow differently at different times. The application access information can be complemented by more metadata about the user or applications that comes from the managed application framework, including desired QoS parameters for specific virtual application traffic, or supplying inputs into policy-based routing, e.g., by describing the current user session or a specific virtual application as more or less trustworthy and requiring the corresponding level of security enforcement.

The SD-WAN application can identify or generate SD-WAN traffic classifications. The classifications can be based on rulesets for matching specific network transport addresses of DNS names. The classification can be based on built-in or remotely hosted URL classification databases. The SD-WAN application can identify or generate classifications by using DPI capabilities.

The SD-WAN application can communicate with the application access framework. The application access framework can transmit, share, send, or otherwise provide the SD-WAN application with the application traffic. In one example, the SD-WAN application can monitor or identify the application traffic shared by the application access framework to identify which virtual application is currently being used and receive reports about the user switching to a different application in real time. The SD-WAN application can monitor or identify such events to dynamically reclassify the application traffic streams. For example, the SD-WAN application can classify the remote graphics packet flow as about the virtual application that the user is currently accessing. By modifying or updating the classification, the SD-WAN application can dynamically change the quality of service and other parameters of its functionality.

The SD-WAN application can monitor or identify application traffic exported by the application access framework that includes policy or security metadata. The SD-WAN application can utilize the application as one of the inputs for application traffic routing. For example, the SD-WAN application can identify an application that reported as less trustworthy, and route its browser content routed through a remote tunnel destination such as a POP with a security service. The SD-WAN application can identify a more trusted application, and provide or grant more access for its redirected browser content.

The SD-WAN application can generate application traffic classifications. For example, the SD-WAN application can classify network traffic for each specific endpoint. The SD-WAN application can identify the application process that generated, originated, or accepted a specific network flow or a transaction. For example, the SD-WAN application can identify the application that generated a DNS request.

The SD-WAN application can associate or identify multiple network flows originating from or accepted by a respective application. The SD-WAN application can differentiate among multiple network flows originating from or accepted by the respective application. For example, the SD-WAN application can differentiate among multiple network flows for a web browser that is providing access to multiple user applications.

The SD-WAN application can include detect and classify shared services. The SD-WAN application can classify shared services for detection and classification of similar third-party services. The SD-WAN application can collect information about web applications usage of specific third-party services. The SD-WAN application can correlate this information across multiple web applications. The SD-WAN application can correlate a single client that can be faster and more comprehensive by providing information about service dependencies to a centralized data processing service. Once a service is identified as a multi-tenant service, the SD-WAN application can classify the service as such. Based on the classification, the SD-WAN application can provide unbundled traffic accounting (assigning shared service traffic to its own bucket for monitoring and analytics purposes) and differentiated application traffic delivery services to the applications associated with the received service traffic. Such differentiated services can range from higher quality of service to lower quality, including best-effort non-tunnel traffic delivery, or complete blocking of shared services that are deemed harmful or unnecessary.

A multi-tunnel SD-WAN application can maintain tunnels to both endpoints, classify the applications regarding their security requirements, determine which set of services (general purpose internet connectivity or connectivity with a layer of security) is required for each application, and use the corresponding tunnel for traffic of that application.

The SD-WAN application can identify endpoints with which to establish or maintain connections or tunnels. The endpoints implemented as a service or a set of services providing connectivity and computing resources shared by multiple service consumers can be known as SD-WAN cloud points of presence or POPs. The endpoint can include general purpose cloud POPs for improved internet connectivity. The endpoint can include POPs that provide security services, such as content filtering, malware scanning, etc. Such services may be available directly in the service POP, or may be delivered by forwarding the traffic from the remote tunnel destination to the relevant security service. The endpoints can be associated with the tunnel destinations located in a specific geographic areas to provide localized connectivity services with low access latency, or to ensure traffic routing through, or customer data residency in, a specific jurisdiction. The endpoint can include POPs located near, or collocated with, specific SaaS applications that provide improved connectivity to those applications. The endpoint can include POPs located in public clouds that provide improved connectivity to those specific public clouds. The endpoint can include POPs that provide direct VPN-like connectivity to private networks.

The endpoints can include POPs (e.g., SD-WAN cloud service POPs) that provide indirect ("Zero Touch Network Access") connectivity to private networks, by routing application network through an additional intermediary service (reverse proxy, access gateway). The endpoints can include a network implementation of a ZTNA POP that includes the chaining of one or more of the following network elements, all of which can be hosted in the endpoint: a tunnel "head-end" implementing tunnel connections from tunnel clients, a proxy or a gateway serving as an intermediary, and a second tunnel "headend" implementing tunnel connections with private networks. The SD-WAN application can provide, maintain, or establish VPN connectivity to the proxy or gateway hosted in the endpoint. In some implementations, the endpoint can prevent or prohibit connectivity to resources on a private network.

The endpoint can be implemented as connectivity and computing resources dedicated to a specific resource consumer and known as site POPs. The endpoints can include compatible physical or virtual SD-WAN appliances capable of accepting client connections from the SD-WAN application. The endpoint can be owned and managed by a service, or owned by service customers and completely or partially managed by the service. The monitoring service 610 can be configured to maintain associations between POPs and virtualized or managed applications and share them with the SD-WAN application. The SD-WAN application can manage or provide indirect management or discovery and association functionality for site SD-WAN appliances in local networks where clients may be located (e.g., remote tunnel destinations 616). For example, the appliances in such networks might not connect via tunnels, but instead provide their own tunnels or other means of application traffic handling that completely or partially supersede the functionality of the SD-WAN application and endpoint.

The SD-WAN application can determine network conditions of the tunnels. The SD-WAN application can collect information about the endpoint location and network environment, as well as availability and current state of network paths leading to that tunnel destination. The client can collect the geographic location of the endpoint. The client can collect classification of the location as more or less trusted.

The SD-WAN application can detect failing network access attempts made by the application that fail for reasons not known to the SD-WAN system. The SD-WAN application can use failing access attempts to troubleshoot and enable access to services that are required but blocked by mistake. The SD-WAN application can use the failing access attempts to detect unapproved or malicious activity from a known or approved application, which may signify that the application has been compromised.

The SD-WAN application can enable the applications to access to a specific intermediary service available at a remote tunnel destination. Service examples can include transparent (e.g., "bump in the wire") security services, application proxies, file caches or WAN accelerators, media relay services, etc. The SD-WAN application can associate a NAT to a specific public IP or IP range assigned to a remote tunnel destination. For example, the SD-WAN application can generate a respective NAT for each SD-WAN tunnel termination.

The SD-WAN can manage application access each remote tunnel destination that is located in or remote to the SD-WAN application. The SD-WAN application can provide direct access to remote tunnel destinations such as a specific allocation in a public cloud (such as Azure or AWS) The SD-WAN application can classify or identify the public cloud based on its cloud location, or access to a generic Internet location. For example, if the destination is a cloud location associated with a particular application, then the SD-WAN application can classify or identify the application.

The monitoring service can assign the applications to a respective tunnel according to the monitored application traffic. The SD-WAN client can use application classifiers and routing rules for matching applications to tunnels. For example, the SD-WAN can require application access to an end service accessible only through a tunnel. The applications and the end services they access may be described in semantic terms (e.g., "self-hosted VOIP," "virtual desktops," "file servers," or any generic tagging) with or without network addressing information used for traditional routing.

At step 708, the SD-WAN application can select a tunnel. The SD-WAN application can select a respective tunnel via which to transmit the application traffic of the application. The SD-WAN application can use the collected information to provide intelligence and capabilities. The additional capabilities can include the ability to automatically detect successful user authentication. For example, by observing a sequence of browser redirections from a website landing page through an authentication service back to the authenticated portion of the website. Understanding whether the user is authenticated allows the SD-WAN solution to provide a differentiated level of service (e.g., bypass additional security inspection).

The SD-WAN application can select the respective tunnel based on applying the application classification to the application classification and routing rules. The SD-WAN application can select the respective tunnel based on a mapping of the NAT to the respective tunnel of the plurality of tunnels. The SD-WAN application can select the respective tunnel based on the metrics received from the monitoring service. The SD-WAN application can select the respective tunnel based on the network conditions of the plurality of tunnels. The SD-WAN application can select the respective tunnel based on the metrics for the virtualized application. As part of tunnel selection, the SD-WAN application can select how the tunnel should treat this specific instance of application traffic based on desired QoS characteristics, including the desired details of bandwidth allocation and path selection.

The SD-WAN application can optimize a cost versus quality tradeoff based on a location of the endpoint. For example, two endpoints can be located within a short network distance from the client that includes the SD-WAN application. One of the endpoints can be hosted in a public cloud, and all traffic originating from this endpoint can incur traffic charges specific to that public cloud, which can be relatively high. On the other hand, the public cloud endpoints can include direct high-quality connections to applications that are hosted in the same public cloud and do not incur any additional charges for traffic to destinations in this public cloud. Another endpoint can be hosted in a colocation facility or internet exchange where general traffic charges may be lower. Thus, it can be suitable for the SD-WAN application to tunnel most application traffic. For traffic going to the public cloud of the first endpoint, however, usage of the endpoint can require a separate network hop (and thus higher latency), as well as additional traffic costs (since traffic can be billed twice, once by the colocation facility or internet exchange provider, and once by the public cloud).

The SD-WAN application can identify the endpoints to be described in the configuration and policy framework as being hosted in a particular environment (such as a specific public cloud) or having a particular preference value based on cost of carrying application traffic. The SD-WAN application can select, maintain, or establish tunnels to both endpoints, classify applications according to the specific public cloud compared to generic internet destination of their traffic, decide which tunnel to use for each application depending on application classification, and route the application traffic to and from the chosen tunnel.

Application routing can address a dynamic quality tradeoff. For example, if two or more endpoints are located within similar network distance from the SD-WAN application, one of the endpoints may temporarily experience a comparatively higher level of load resulting in degraded level of service. The SD-WAN application can have the ability to select or maintain tunnels to both over-loaded and under-loaded endpoints, receive information about their load level, and dynamically switch some or all application traffic to a less loaded endpoint to maintain optimal quality of application traffic delivery. As the overloading state is dynamic in nature, the previously overloaded endpoint can over time become more available, causing the SD-WAN application to shift the traffic by selecting tunnels back to maintain load balancing. Both shifts can occur transparently to the end user since the SD-WAN application can maintain both tunnels up and active during the dynamic transition.

In another example of dynamic quality tradeoff, connection between the SD-WAN application and one of the endpoints can temporarily deteriorate, for example, due to global disruptions of traffic routing. The SD-WAN application can maintain tunnels to endpoints with currently better and currently worse connectivity, and the SD-WAN application can select tunnels to shift application traffic to the endpoints with better access.

Application routing can address a tradeoff between security versus quality and cost. The SD-WAN application can provide security services, such as content filtering or malware scanning, within a particular service endpoint or in proximity to that service endpoint. For a given SD-WAN application, the endpoint can provide the security services required for that SD-WAN application and a particular set of applications to follow the enterprise security policy. Usage of these security services may be associated with a higher cost of service (since they may use premium computing or network resources or be generally in higher demand). At the same time, the same SD-WAN application can identify another endpoint that is available in closer network proximity to the SD-WAN application than the security-enabled endpoint. This closer endpoint can then be preferred for any application traffic that does not require the security services.

The SD-WAN application can facilitate source IP anchoring. In a similar configuration with two endpoints, one more remote and one more local, the more remote endpoint may be configured with a static IP or a static IP range suitable for accessing a particular application (as that application may implement access control by requiring all user access to come from a known set of source IP addresses). The endpoint that is closer can still be preferred for other application traffic due to proximity and higher availability. A multi-tunnel client can maintain tunnels to both endpoints and would send application traffic requiring a particular source IP to the remote endpoint hosting that IP, and other application traffic to the closer endpoints.

The SD-WAN application can select the respective tunnel based on the application traffic. The SD-WAN application can route network traffic based on routing rules outside of network packet parameters (such as the source and destination IP addresses and ports) to provide better network quality of service and better user experience, and/or to address application-specific security requirements. The routing rules can be assigned to applications based on application classification, and match application flows with specific tunnel destinations.

The SD-WAN application can implement rules to route application traffic flows matching certain security-related rules, or not matching any rules, to one of the tunnels leading to endpoint that provide security services (content filtering, malware scanning, etc.). The SD-WAN application can implement rules to route application traffic flows matching certain location or jurisdiction-related rules, or not matching any rules, to one of the tunnels leading to endpoint located in a specific geographic area. The SD-WAN application can implement rules to route application traffic flows to or from a specific SaaS application to one of the tunnels leading to endpoint located near, or collocated with, that specific SaaS application.

The SD-WAN application can implement rules to route application traffic flows to or from a specific public cloud to one of the tunnels leading to endpoint located in that specific public cloud. The SD-WAN application can implement rules to route application traffic flows for applications located in a private network to one of the tunnels leading to endpoint that provide direct VPN-like connectivity to that private network. The SD-WAN application can implement rules to route application traffic flows for applications located in a private network to one of the tunnels leading to endpoints that provide indirect ("Zero Touch Network Access") connectivity to that private network.

The SD-WAN application can implement rules to route application traffic flows to different cloud endpoint sites based on the distinction between physical applications (installed or executed locally on the endpoint) and virtual applications (accessed through an application virtualization framework). The SD-WAN application can implement rules to route application traffic flows to different endpoints in the cloud based on individual virtual or managed applications being hosted at or accessible through specific endpoints. The SD-WAN application can implement rules to route application traffic flows to different endpoints in the cloud or SD-WAN sites based on applications that are unmanaged (self-installed) versus managed (sanctioned and/or delivered through the application management framework). The SD-WAN application can implement rules to route application traffic flows to different endpoints in the cloud based on other metadata about applications that may be supplied by the managed application client.

At step 710, the SD-WAN application can transmit traffic via the tunnel. The SD-WAN application can transmit the application traffic via the selected tunnel. The SD-WAN can transmit the application traffic to the endpoint by transmitting the traffic on the tunnel to the corresponding network connection to the endpoint.

The SD-WAN application can modify or influence the usage of individual network paths comprising the tunnel for conveying the application traffic. For example, the SD-WAN application can identify that some applications can be deemed eligible for enhanced reliability at the expense of additional network bandwidth usage, and the SD-WAN application can establish duplicate transmission of application network packets through multiple parallel paths for the identified applications. In another example, the SD-WAN application can identify that the applications are known to be more sensitive to in-order packet delivery but less sensitive to latency, and the SD-WAN application can establish a persistent path as opposed to frequent path switching for load balancing or latency management for the identified applications.

By switching between the SD-WAN application and the endpoints, the SD-WAN application can enable a more secure intermediated access mode in enterprise-internal resources ("Zero Touch Network Access," or "ZTNA") by including an integrated application proxy capability in the SD-WAN path (e.g., when the SD-WAN application routes to the endpoints). In addition to being considerably more secure than the traditional VPN access, this SD-WAN-based ZTNA approach can remove the need to deploy application-specific "connectors" in the private resource location, thus functionally replacing them with a generic SD-WAN connection between the remote tunnel destination and the private resource network location.

G. Systems and Methods for Updating a Configuration of an SD-WAN Application Using Historic or Predictive Data The systems and methods described herein include SD-WAN client with predictive operation and configuration for SD-WAN tunnels. The systems and methods described herein relate to generating models for both user activity and client activity for predicting future demands for the SD-WAN functionality. Based on these predictions, the SD-WAN (and client) can implement ahead-of-time adjustments in different modes of operations.

According to the implementations and embodiments described herein, a software-defined wide area network (SD-WAN) application executing on a client device can receive one or more of historic or predictive data relating to connectivity or usage of the client device. The SD-WAN application can detect an update condition for the SD-WAN application using the one or more historic or predictive data relating to the connectivity or usage of the client device. The SD-WAN application can update a configuration of the SD-WAN application responsive to detecting the update condition. The SD-WAN application can transmit application traffic using the updated configuration.

Quality and security features provided by an SD-WAN are not always necessary, because they are most useful when users are actively accessing applications that benefit from SD-WAN functionality. By using historic or predictive data, the implementations and embodiments described herein can predict when the users will use and access the resources provided by the SD-WAN system. By predicting the usage, the SD-WAN system can optimize the use of local endpoint resources (CPU, power), service resources, and network bandwidth. For example, the optimizing these resources can be beneficial because some of these computing resources can be metered and/or capped. A system where SD-WAN features are available only when needed can provide better user experience while using fewer computing resources. Various other advantages are described in greater detail below.

Figure 8:
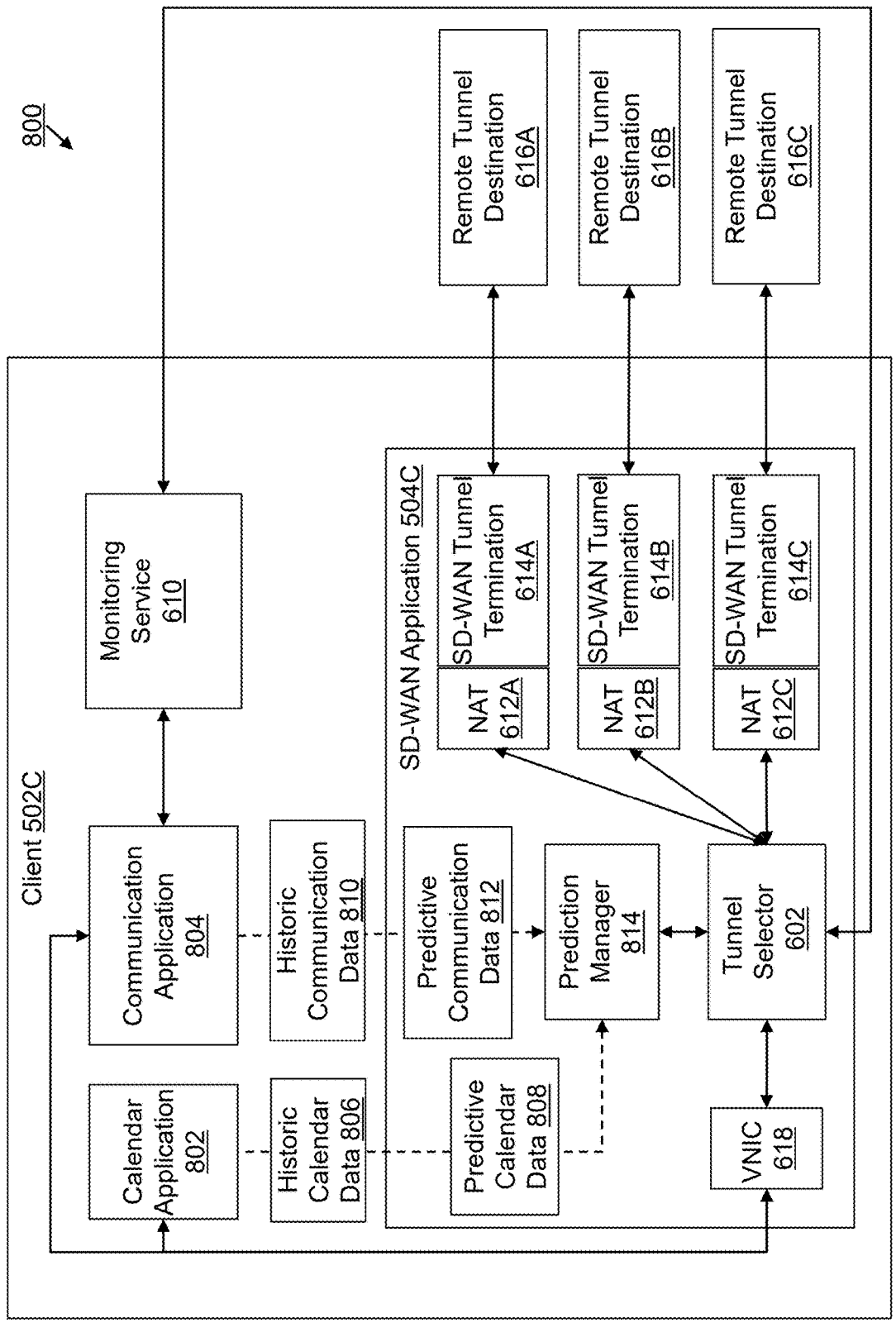
FIG. 8 is a block diagram of a system for updating a configuration of an SD-WAN application using connectivity or usage data, in accordance with an illustrative implementation.

Referring now to FIG. 8, depicted is a block diagram of a system 800 for updating configurations of an SD-WAN application using historic or predictive data, according to illustrative implementations. The system 800 is shown to include the client 502C, which can be similar to and include the functionality of client 502A and/or client 502B, but client 502C can include the calendar application 802 and the communication application 804. The calendar application 802 can provide historic calendar data 806 and predictive calendar data 808. The communication application 804 can generate historic communication data 810 and predictive communication data 812. The system can include the SD-WAN application 504C, which can be similar to and include the functionality of SD-WAN application 504A and/or SD-WAN application 504B. Additionally, the SD-WAN application 504C can include a prediction manager 814. The prediction manager 814 can receive the historic calendar data 806, predictive calendar data 808, historic communication data 810, and predictive communication data 812 to predict application traffic for the tunnel selector 602 to select a tunnel via which to route the application traffic. For example, the tunnel selector 602 can be configured to use the collected information to provide intelligence and capabilities. In another example, the prediction manager 814 can be configured to automatically detect successful user authentication. In yet another example, the prediction manager 814 can be configured to identify and observe a sequence of browser redirections from a website landing page through an authentication service back to the authenticated portion of the website. Understanding whether the user is authenticated enables the SD-WAN application 504C to provide a differentiated level of service (e.g., bypass additional security inspection).

The systems and methods of the present solution may be implemented in any type or form of device, including clients, servers, or appliances described above with reference to FIG. 1A-FIG. 7. In some implementations, the prediction manager 814 can include or incorporate components and devices similar in some aspects to those described above with reference to FIG. 1C, such as a memory and/or one or more processors operatively coupled to the memory.

The present systems and methods may be implemented in any implementations or aspects of the appliances or devices described herein.

The SD-WAN application 504C can be configured to provide SD-WAN features on demand. For example, the tunnel selector 602 can be configured to select tunnels 506 when application attempts to establish connectivity are detected, or enable more costly wireless connectivity when wired connectivity is failing. The tunnel selector 602 can be configured to change the tunnel configuration to increase the number of network paths 507 and NICs 508 eligible to be used by the tunnel. For example, as shown in FIG. 5, each tunnel 506 can be associated with multiple network paths 507. The SD-WAN application 504C can implement historic or predictive configuration changes by adding or removing eligible network paths 507 via which the tunnel 506 connects to remote tunnel destinations 616 (e.g., the same or statically configured). For example, the SD-WAN application 504C can select the tunnel 506 to use paths 507 associated with Wi-Fi connectivity, parallel Wi-Fi and mobile/cellular connectivity, or exclusively mobile connectivity.

The SD-WAN application 504C can be configured to provide SD-WAN features predictively or ahead of time, before anticipated or predicted usage, which can result in superior user experience and minimize any possible downtime. For example, the SD-WAN application 504C can be configured to eliminate the time needed to react to application demand. To achieve this functionality, the prediction manager 814 can collect both historic and predictive data 806-812 about application usage for the tunnel selector 602 to manage or select different connections.

The prediction manager 814 of the SD-WAN application 504C can be configured to receive historic or predictive data 806-812 relating to connectivity or usage of the client 502. The prediction manager 814 can be included in the SD-WAN application 504C executing on the client 502. The prediction manager 814 can be configured to provide integration APIs for enabling third-party application developers, enterprise administrators, or end users to explicitly provide predictive data 808, 812 about predicted application usage for the calendar application 802 and the communication application 804. For example, the prediction manager 814 can use the predictive data 806 to identify a schedule of more sophisticated and resource intensive SD-WAN connectivity during commute times while selecting less sophisticated and less resource intensive SD-WAN feature sets at home and/or in the office. The prediction manager 814 can be configured to identify a policy management framework or an application access framework to receive supply APIs, integration points, micro-apps or micro-app frameworks ("integration APIs") that allow third-party application developers, enterprise administrators, or end users to provide predictive information about anticipated application usage. The prediction manager 814 can be configured to use the integration APIs to receive the historic or predictive data 806-812 about required or desired connectivity.

The historic data can include a resource usage history data of applications of the client 502C, historic location data of locations of the client 502C, or historic connection data of connections used by the prediction manager 814. The prediction manager 814 can be configured to use historical data 806, 810 for predictive extrapolation. For example, application usage history can include days and times of usage for a particular application, history of locations visited by the user, history of connectivity provided by specific physical networks (e.g., Wi-Fi, cellular), associated with geographic location where access through such networks was attempted.

The predictive data can include calendar data for a user of the client 502C, communication data for the user of the client 502C, or data received via an application program interface (API) for predictive usage of one or more resources of the client 502C. The prediction manager 814 can be configured to receive predictive calendar data 808 from the calendar application 802 or the predictive communication data 812 from the communication application 804. The predictive calendar data 806 can include notifications about upcoming network communication sessions (e.g., meetings, conference calls) that indicate specific types or network connectivity, such as real-time or voice connectivity, are going to be required in the near future. The predictive communication data 810 can indicate the communication tool and/or modality (e.g., voice vs video) to be used, as well as importance of connection quality (e.g., customer vs internal meetings). The predictive calendar data 806 can also include predictive information about user location (e.g., for in-person work meetings, non-work appointments, vacations, etc.). The predictive calendar data 806 can include user location (e.g., calendars or work schedules). For example, the predictive calendar data 806 can indicate remote tunnel destination (and user) movement between locations with different available network connectivity.

The prediction manager 814 can include a connectivity policy mechanism. The prediction manager 814 can be configured to provide a framework for defining connectivity policies. The prediction manager 814 can be configured to share the client connectivity policies, or provide integration with, the definition of other network or security policies, including SD-WAN configuration or configuration of other cloud-delivered connectivity or security services.

The client connectivity policies can provide administrator workflows to enable "intent-based" configuration, whereby a high-level definition of the administrator's desire to improve connectivity to a particular application or apply a particular security policy to all users is translated into multiple lower-level policy definition elements, including those applicable to the client 504C and remote tunnel destinations (e.g., cloud or site POPs). The prediction manager 814 can be configured to receive the set of applicable connectivity policies from the service. The prediction manager 814 can maintain authenticated access to the service-delivered policy definition, with multiple methods of authentication, including federated authentication.

The prediction manager 814 can be configured to include a policy delivery mechanism that supports multi-tenant service requirements by identifying the service tenant (customer) based on user identity. The prediction manager 814 can be configured to include cases from multiple tenants access the same application 604-608, 802, 804, such as a shared workstation, at different times. After the tenant is identified, the prediction manager 814 can receive the tenant-specific policy.

The prediction manager 814 can be configured to use the multi-tunnel client or service policies to provide varying levels of control over client functionality. The prediction manager 814 can be configured to delegate some elements of policy definition to the client. For example, the prediction manager 814 can be configured to identify SD-WAN connectivity policies such as provisioned bandwidth values for individual physical network connections, specific IP addresses and ports applicable to appliances, or their local or wide area network connections, etc. Some multi-tunnel client or service policies can leave such parameters undefined. For example, the parameters can be defined as acceptable ranges, such as to limit product functionality based on licensing constraints, or to have the prediction manager 814 detect these parameters automatically. Auto-configuration can typically be combined with a policy requirement to report auto-detected parameters to the monitoring service.

The policy definition received by the prediction manager 814 from the monitoring service can be dependent on parameters reported by the prediction manager 814. For example, the parameters can include posture, location, and network environment. While policies received by the prediction manger 814 in unsecured environments may omit such cryptographic material, which precludes the establishment of the corresponding tunnels, the prediction manager 814 can be configured to use the policy definition as an element for security risk mitigation. For example, connectivity policies may include cryptographic material (such as security keys) needed to establish some of the tunnels. This policy definition can be used to optimize traffic delivery or address jurisdictional concerns. For example, the prediction manager 814 can be configured to define different policies for different geographic locations.

The prediction manager 814 can be configured to use the connectivity policy to establish the required network tunnels and implement network traffic processing based on the current policy. The prediction manager 814 can be configured to use applicable policies such as application-specific tunnel configuration and operation capabilities. The number of supported tunnels, specific protocols and protocol options used for the tunnels ("tunnel operations") can depend on various factors.

The prediction manager 814 can be configured to detect or identify an update condition for the prediction manager 814 using the historic or predictive data 806-812 relating to the connectivity or usage of the client 502. For example, the update condition can be a user leaving their home or office (and correspondingly the client no longer being connected to a home or an office network). When the user leaves the office, the tunnel selector can enable a new tunnel or cause an existing persistent tunnel to switch from a Wi-Fi or office network to a cellular network. If the prediction manager 814 identifies that a user is expected to leave their office at 6:00, then the tunnel selector 602 can anticipate the switch at 6:00. The update condition may be or include a condition in which the prediction manager 814 identifies where the prediction manager 814 is to update a configuration or setting for the SD-WAN application 504C. For example, the update condition may be or include a prediction that a user is going to leave the office at a particular time, that a user will access a particular resource or application at a particular time, etc.

The prediction manager 814 can be configured to identify the update condition based on the historic or predictive data 806-812. For example, and in some implementations, the prediction manager 814 can be configured to ingest or otherwise receive the historic data 806, 810 for generating or otherwise deriving one or more trends. The prediction manager 814 can be configured to generate the one or more trends by performing or applying a pattern recognition algorithm to the historic data 806, 810. The trends may indicate frequently occurring conditions at a particular time of day or day of the week. The prediction manager 814 can be configured to use the trends to predict a likelihood or probability of a similar condition occurring at a future time. If the probability exceeds a predetermined threshold, the prediction manager 814 can be configured to identify the condition as an update condition.

Similarly, and in some implementations, the prediction manager 814 can be configured to ingest or otherwise receive predictive data 808, 812, and parse the predictive data 808, 812. The prediction manager 814 can be configured to parse the predictive data 808, 812 to identify potential conditions. The prediction manager 814 can be configured to identify a location and/or time for scheduled meetings, messages exchanged relating to potential calls or meetings, and so forth based on data extracted from the predictive data responsive to parsing the predictive data. For example, the prediction manager 814 can be configured to identify SMS messages regarding a potential meeting responsive to applying a natural language processing model to the SMS message. As another example, the prediction manager 814 can be configured to identify a scheduled meeting responsive to applying a field-value extraction model to a calendar entry to identify a time, location, and acceptance value for the calendar entry. In these examples, the prediction manager 814 can be configured to identify the potential meetings as update conditions.

In some implementations, the prediction manager 814 can be configured to detect or identify the update condition corresponding to that is based on the remote tunnel destinations 616. For example, the update condition can be based on a number of supported tunnels, specific protocols, and protocol options used for the tunnels that depends on capabilities of the remote tunnel destinations 616. In another example, the update condition can be based on available CPU processing capacity. In another example, the update condition can use different ciphers that are based on availability of hardware acceleration for the configuration.

The prediction manager 814 can be configured to detect or identify the update condition corresponding to a number of supported tunnels 506, and specific protocols and protocol options used for the tunnels 506 can depend on available energy supply. For example, the prediction manager 814 can be configured to establish or use more tunnels 506 or more sophisticated QoS when plugged in and establish or use fewer tunnels 506 when using battery power.

The prediction manager 814 can be configured to detect or identify the update condition corresponding to a number of supported tunnels, specific protocols, or protocol options used for the tunnels based on current locations of the remote tunnel destinations 616. For example, the prediction manager 814 can be configured to use GPS data to determine the location of the remote tunnel destinations 616. The prediction manager 814 can be configured to detect or identify the update condition corresponding to a number of supported tunnels, specific protocols, or protocol options used for the tunnels that depends on anticipated change in the location of the remote tunnel destinations 616. For example, the prediction manager 814 can be configured to identify the movement history of a user (e.g., when they are at the office), or receive location information from other sources such as the calendar application 802 that provides historic calendar data 806 and predictive calendar data 808.

The prediction manager 814 can be configured to detect or identify the update condition corresponding to a number of supported tunnels 506, specific protocols, and protocol options used for the tunnels 506 that includes reactive or proactive adjustment of tunnel operations, such as setting up new tunnels 506 or terminating existing tunnels 506, or changing the usage pattern of underlying network connections.

To detect the update condition, the prediction manager 814 can be configured to determine or identify a predicted change from a first location of the client 502C using a first connection type supported by the prediction manager 814 to a second location of the client 502C using a second connection type supported by the prediction manager 814. The prediction manager 814 can be configured to receive or identify the historical or predictive data 806-812 about application usage, location, or network environment. For example, the prediction manager 814 can be configured to identify or receive application usage history, history of network locations, or history of connectivity provided by specific physical networks 510 (Wi-Fi, cellular), associated with geographic location where access through such networks 510 was attempted. The prediction manager 814 can be configured to identify or determine the predicted change based on the historic or predictive data 806-812. With both sources of information about future demands for SD-WAN functionality, the client 502C and the rest of the SD-WAN system 1000 can implement ahead-of-time adjustments in their mode of operation.

The first connection type can be a Wi-Fi connection type, and the second connection type can be a cellular connection type. For example, anticipating the change in endpoint 512 (and user) location from an office or home network with high-quality Wi-Fi connectivity to being "on the road" without Wi-Fi connectivity, the client 502C can proactively change the role of a path 507, a cellular NIC 508, and a cellular network connection 510, from "backup" to "primary," ensuring uninterrupted application connectivity through a tunnel 506 as the user moves among different locations. When the user arrives at a location where Wi-Fi connectivity is available, and the prediction indicates that the user will stay in this location for a while, the prediction manager 814 can modify or change the cellular physical connection role to "backup" and restore the Wi-Fi physical connection role to "primary."

To detect the update condition, the prediction manager 814 can be configured to determine predicted application traffic for the client 502C. The prediction manager 814 can be configured to receive or identify predictive information about application usage. The prediction manager 814 can be configured to identify or determine the predicted application traffic based on the historic or predictive data 806-812. The prediction manager 814 can be configured to receive or identify the calendar data 806, 808 from the calendar application 802. The prediction manager 814 can be configured to identify or receive communications data 810, 812 from the communications application 804. For example, the calendar data 806, 808, and the communication data 810, 812 can indicate upcoming network communication sessions (meetings, conference calls) that provide indication that specific types or network connectivity. For example, the information can show real-time or voice connectivity.

To update the configuration, the prediction manager 814 can be configured to establish a first tunnel 506A and a second tunnel 506B for the predicted application traffic. For example, if a voice or video conference is predicted, the tunnel selector 602 can select or establish a tunnel 506 for the predicted application traffic. To detect the update condition, the prediction manager 814 can be configured to identify or determine, based on the calendar data or the communication data, whether to establish a session for the client 502C at a second time subsequent to a current time. For example, the tunnel can be to a remote tunnel destination 616 (e.g., service POP) best equipped for optimal service for the online conference that is about to start. The prediction manager 814 can be configured to identify or determine a predicted session modality for the session to be established. For example, the prediction manager 814 can be configured to identify or determine whether the conference will include audio or video calls.

The tunnel selector 602 can be configured to determine or identify a quality of service (QOS) value for the session. The tunnel selector 602 can be configured to select or identify the tunnels 506 to provide SD-WAN QOS features over virtual network connections. The tunnel selector 602 can be configured to dynamically reallocate available bandwidth among network paths 507, tunnels 506, or their combinations. For example, if the session is a conference call, the tunnel selector 602 can be configured to determine or identify the attendees. If the tunnel selector 602 determines that all the attendees belong to the same entity or network, the tunnel selector 602 can be configured to identify a first QoS value (e.g., low priority value since the call is among co-workers). If the tunnel selector 602 can be configured to determine that all the attendees belong to different entities or networks, the tunnel selector 602 can identify a second QoS value (e.g., high priority value since the call is among VIP users).

The tunnel selector 602 can be configured to reallocate bandwidth based on demand or other metrics. The tunnel selector 602 can be configured to provide or identify QoS to multiple physical connections. The tunnel selector 602 can be configured to provide QoS by improving connection latency by selecting the optimal physical connection and corresponding path 507 for individual tunneled data packets. The tunnel selector 602 can be configured to provide QoS by improving connection reliability through packet retransmissions or forward error correction. The tunnel selector 602 can be configured to provide QoS by identifying packet duplication.

To update the configuration of the SD-WAN application 504C, the tunnel selector 602 can be configured to establish the session based on the predicted session modality and the QoS value prior to the second time. For example, the tunnel selector 602 can be configured to identify or determine a QoS value of a potential session and determine whether the conference will include audio or video calls. For example, if the session is an audio call, then the tunnel selector 602 can be configured to determine that since audio calls are not disrupted by lower quality connections, the tunnel selector 602 can identify or assign a first QoS value (e.g., low priority value). If the tunnel selector 602 determines or identifies if the session is a video call, then the tunnel selector 602 can be configured to determine that since video calls can be disrupted by lower quality connections, the tunnel selector 602 can identify or assign a second QoS value (e.g., high priority value).

Based on the QoS value and the modality, the SD tunnel selector 602 can be configured to provide or allocate reserved bandwidth for specific types of network traffic or the tunnel selector 602 can be configured to identify or reserve bandwidth for specific tunnels 506 or paths 507 (e.g., reserve bandwidth for video calls or for calls for VIP). In another example, the tunnel selector 602 can be configured to identify or anticipate the need for a particular type of application traffic to be handled with additional QoS or with additional security features. For example, the tunnel selector 602 can be configured to detect or identify an upcoming communication session based on the calendar data or the communication data (e.g., an upcoming conference call). In another example, the tunnel selector 602 can be configured to detect or identify an upcoming communication session based on calendar data or the communication data received or supplied through the integration APIs. In another example, the SD-WAN application 504C can detect an upcoming communication session based on calendar data or the communication data received by identifying that the remote tunnel destination 616 is communicating with the communication application 804 to start a communication session (e.g., call is about to start).

The tunnel selector 602 can be configured to establish or generate an additional tunnel 506 or an additional path 507 for the anticipated application traffic. For example, the SD-WAN application 504C can be configured to establish a tunnel 506 for using cellular services as a backup for a tunnel 506 using Wi-Fi services. The tunnel selector 602 can establish a tunnel 506 to a specific remote tunnel destination 616 (e.g., remote service POP or remote site associated with the communications application). The tunnel selector 602 can change the configuration of an existing tunnel 506. For example, the tunnel selector 602 can change the status of a cellular physical connection implemented by a NIC 508 and used by a path 507 from "standby" to "active" to reduce the time needed to react to traffic disruption and implement transparent traffic failover from Wi-Fi to cellular (e.g., if the Wi-Fi connection fails, then the switch to cellular is faster because it is on standby). Similarly, at the end of the communication session, the tunnel selector 602 can revert the changes described above as a means to minimize the cost of network connectivity, the load and associated costs for remote tunnel destinations, or endpoint 512 energy usage.

The tunnel selector 602 can update the configuration responsive to detecting the update condition. The tunnel selector 602 can route application traffic to one of the available tunnels 506 based on the match of application traffic properties (classification), endpoint 512 posture, location and network environment, and the properties of the tunnel 506 or its destination. For example, the tunnel selector 602 can implement rules defined in the policy. The tunnel selector 602 can implement rules to route application traffic flows matching certain rules, or not matching any other rules, to one of the tunnels 506 leading to remote tunnel destinations such as general purpose POPs. The tunnel selector 602 can select a specific remote tunnel destination 616 or one of several equivalent POPs. The tunnel selector 602 can select the destination remote tunnel destination based on dynamically tunnel characteristics (available bandwidth, latency, packet loss) of the tunnel 506. The tunnel selector 602 can choose the remote tunnel destination based on its characteristics (proximity to the final-destination, POP load level, customer entitlements, usage quota).

The tunnel selector 602 can implement rules to route application traffic flows to different remote tunnel destinations 616 based on the distinction between physical applications (installed or executed locally on the endpoint 512) and virtual applications (accessed through an application virtualization framework). The tunnel selector 602 can implement rules to route application traffic flows among different remote tunnel destinations 616, such as cloud POPs or SD-WAN sites, based on individual virtual or managed applications being hosted at or accessible through specific POPs or SD-WAN sites. The tunnel selector 602 can implement rules to route application traffic flows to different remote tunnel destinations 616, such as cloud POPs or SD-WAN sites, based on applications that are unmanaged (self-installed) versus managed (sanctioned and/or delivered through the application management framework). The tunnel selector 602 can implement rules to route application traffic flows among different remote tunnel destinations 616, cloud POPs, or SD-WAN sites based on other metadata about applications that may be supplied by the client 502C.

The tunnel selector 602 can implement rules to determine applicability of these routing rules based on endpoint 512 characteristics, such as application versioning, endpoint 512 posture, location, and network environment. The tunnel selector 602 can implement rules to implement multiple application traffic routing rules and apply them in a particular order of precedence, including, for example, applying relevant security-sensitive rules before corresponding traffic delivery optimization rules.

The SD-WAN connectivity policy provisioned by the tunnel selector 602 can depend on the security circumstances of the client 502C and provide several graduated levels of connectivity service. The tunnel selector 602 can perform an assessment of endpoint 512 security (e.g., whether the endpoint 512 has the elements of enterprise management framework) and network security (e.g., whether the endpoint 512 is in a known secure location, or whether the endpoint 512 is in a country foreign to where the customer using the SD-WAN service of the client 502C is domiciled). The tunnel selector 602 can report this assessment to the SD-WAN service of the client 502C when establishing, or re-establishing, service connectivity.

Based on the assessment reported by the endpoint 512 or applications 604-608, the client 502C may choose to send different provisioning profiles to the SD-WAN application 504C. For example, the client 502C can establish tunnels 506 enabling connectivity to more sensitive locations in the provisioning profile to a client 502C considered to be in a more secure environment. Similarly, some tunnels 506 may include fewer security features (e.g., faster but less secure ciphers). Profiles sent to less secure endpoints 512 or locations may be filtered to remove sensitive cryptographic material. The multi-tunnel capable SD-WAN client 502C can provide the optimal level of service for each environment where the user may find themselves.

The SD-WAN application 504C can be configured to update the configuration of the tunnels 506 by switching a designation of a network connection from a primary connection to a back-up connection. The SD-WAN application 504C can be configured to make the switch by anticipating the change in endpoint 512 (and user) location. For example, the SD-WAN application 504C can be configured to predict or anticipate a change in the user's location from an office or home network with high-quality Wi-Fi connectivity to being "on the road" without Wi-Fi connectivity. The SD-WAN application 504C can be configured to update the configuration based on the change in location.

Based on the updated configuration, the SD-WAN application 504C can be configured to establish a tunnel 506 for the application traffic. For example, the SD-WAN application 504C can be configured to establish multiple network tunnels 506 to different remote tunnel destinations 616. The SD-WAN application 504C can be configured to proactively modify or change the role of a secondary cellular physical network location and the corresponding NIC 508 and path 507 for one or more tunnels 506 from "backup" to "primary." The SD-WAN application 504C can be configured to modify the configuration to ensure uninterrupted application connectivity as the user moves among different locations. The SD-WAN application 504C can be configured to revert the change. For example, when the user arrives at a location where Wi-Fi connectivity is available, the SD-WAN application 504C may change the cellular physical connection role to "backup" and restore the Wi-Fi physical connection role to "primary."

The SD-WAN application 504 can transmit application traffic via the tunnels 506 established based on the updated configuration. To transmit the application traffic using the updated configuration, the SD-WAN application 504C can load balance the application traffic between the first path 507 and the second path 507. For example, the SD-WAN application 504C can simultaneously change the cellular and Wi-Fi connections from "backup" and "primary" to "load-balanced." The change can ensure that any connection failover will take minimal time and avoid any traffic disruptions, such as during the conference call. The SD-WAN application 504C can revert this change. For example, the SD-WAN application 504C can revert the change when the conference ends and if there are no other conferences starting thereafter. The SD-WAN application 504C can reverse the normal configuration to reduce resource usage (e.g., battery drain) and cost of service.

Figure 9:
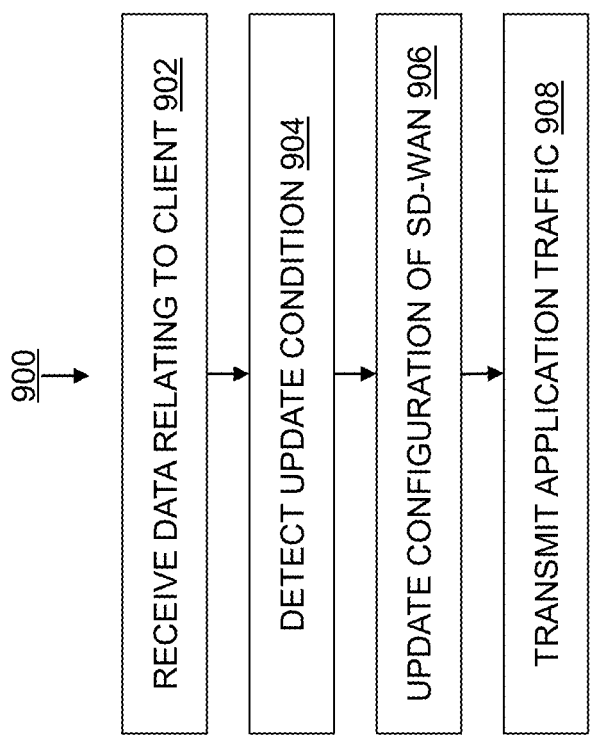
FIG. 9 is a flow diagram of a method for updating a configuration of an SD-WAN application using connectivity or usage data, in accordance with an illustrative implementation.

Referring to FIG. 9, depicted is a flow diagram of a method 900 for updating a configuration of an SD-WAN application using connectivity or usage data, in accordance with an illustrative implementation. The method 900 (including various steps included therein) may be implemented by one or more of the components shown in FIGS. 5, 6, and 8 as described above, such as the client 502, SD-WAN application 504, etc. As a brief overview, at step 902, a SD-WAN application receives data relating to a client. At step 904, the SD-WAN application can detect update conditions. At step 906, the SD-WAN application can update configurations of SD-WAN. At step 908, the SD-WAN application can transmit application traffic.

SD-WAN systems can provide SD-WAN features on demand. For example, the SD-WAN application can bring up tunnels when application attempts to establish connectivity are detected, or enable more costly wireless connectivity when wired connectivity are failing. The SD-WAN application can change the tunnel configuration to increase the number of network paths and NICs eligible to be used by the tunnel. For example, as shown in FIG. 5, each tunnel can be associated with multiple network paths. The SD-WAN application can implement historic or predictive configuration changes by adding or removing eligible network paths via which the tunnel connects to remote tunnel destinations (e.g., the same or statically configured). For example, the SD-WAN application can select the tunnel to use paths associated with Wi-Fi connectivity, parallel Wi-Fi and mobile/cellular connectivity, or exclusively mobile connectivity.

The SD-WAN client application can provide SD-WAN features predictively or ahead of time, before anticipated usage, which can result in superior user experience and minimize any possible downtime. For example, SD-WAN client application can eliminate the time needed to react to application demand. To achieve this functionality, the SD-WAN application can collect both historic and predictive data about application usage for the SD-WAN application to manage or select different connections.

At step 902, a SD-WAN application receives data relating to a client. The SD-WAN application can be a software-defined wide area network (SD-WAN) application executing on a client device. The SD-WAN application can receive historic or predictive data relating to connectivity or usage of the client device. The SD-WAN application can provide integration APIs to allow third-party application developers, enterprise administrators, or end users to explicitly provide predictive data about predicted application usage. For example, the predictive information can define a schedule of more sophisticated and costly SD-WAN connectivity during commute times while supporting less aggressive SD-WAN feature set at home and/or in the office. The SD-WAN application can include a policy management framework or the an application access framework to receive supply APIs, integration points, micro-apps or micro-app frameworks ("integration APIs") that allows third-party application developers, enterprise administrators, or end users to provide predictive information about anticipated application usage. The SD-WAN application can use such integration APIs to "push" or receive information such as the historic or predictive data (e.g., historic or predictive data 806-812) about required or desired connectivity to the SD-WAN client application.

The historic data can include a resource usage history data of applications of the client device, historic location data of locations of the client device, or historic connection data of connections used by the SD-WAN application. Historical information by the client and used for predictive extrapolation can include application usage history can include days and times of usage for a particular application, history of locations visited by the user, history of connectivity provided by specific physical networks (e.g., Wi-Fi, cellular), associated with geographic location where access through such networks was attempted.

The predictive data can include calendar data for a user of the client device, communication data for the user of the client device, or data received via an application program interface (API) for predictive usage of one or more resources of the client device. The SD-WAN application can receive predictive data from the calendars application or the communication application. The predictive data can include notifications about upcoming network communication sessions (e.g., meetings, conference calls) that indicate specific types or network connectivity, such as real-time or voice connectivity, are going to be required in the near future. The predictive data can indicate the communication tool and/or modality (e.g., voice vs video) to be used, as well as importance of connection quality (e.g., customer vs internal meetings). Calendars can also be a source of predictive information about user location (e.g., for in-person work meetings, non-work appointments, vacations, etc.). The predictive information can include user location (e.g., calendars or work schedules). For example, predictive information can be about remote tunnel destination (and user) movement between locations with different available network connectivity.

The SD-WAN application can include a connectivity policy mechanism. The SD-WAN application can provide a framework for defining connectivity policies. The SD-WAN application can share the client connectivity policies, or provide integration with, the definition of other network or security policies, including SD-WAN configuration or configuration of other cloud-delivered connectivity or security services.

The client connectivity policies can provide administrator workflows to enable "intent-based" configuration, whereby a high-level definition of the administrator's desire to improve connectivity to a particular application or apply a particular security policy to all users is translated into multiple lower-level policy definition elements, including those applicable to the client and remote tunnel destinations (e.g., cloud or site POPs). The SD-WAN application can receive the set of applicable connectivity policies from the service. The SD-WAN application can maintain authenticated access to the service-delivered policy definition, with multiple methods of authentication, including federated authentication.

The SD-WAN application can include a policy delivery mechanism that supports multi-tenant service requirements by identifying the service tenant (customer) based on user identity. The SD-WAN application can include cases from multiple tenants access the same application, such as a shared workstation, at different times. After the tenant is identified, the SD-WAN application can receive the tenant-specific policy.

The SD-WAN application can use the multi-tunnel client or service policies to provide varying levels of control over client functionality. The SD-WAN application can delegate some elements of policy definition to the client. For example, the SD-WAN application can identify SD-WAN connectivity policies such as provisioned bandwidth values for individual physical network connections, specific IP addresses and ports applicable to appliances, or their local or wide area network connections, etc. Some multi-tunnel client or service policies can leave such parameters undefined. For example, the parameters can be defined as acceptable ranges, such as to limit product functionality based on licensing constraints, or to have the SD-WAN application detect these parameters automatically. Auto-configuration can typically be combined with a policy requirement to report auto-detected parameters to the monitoring service.

The policy definition received by the SD-WAN application from the monitoring service can be dependent on parameters reported by the SD-WAN application. For example, the parameters can include posture, location, and network environment. While policies received by the SD-WAN application in unsecured environments may omit such cryptographic material, which precludes the establishment of the corresponding tunnels, the SD-WAN application can use the policy definition as an element for security risk mitigation. For example, connectivity policies may include cryptographic material (such as security keys) needed to establish some of the tunnels. This policy definition can be used to optimize traffic delivery or address jurisdictional concerns. For example, the SD-WAN application can define different policies for different geographic locations.

The SD-WAN application can use the connectivity policy to establish the required network tunnels and implement network traffic processing based on the current policy. The SD-WAN application can use applicable policies such as application-specific tunnel configuration and operation capabilities. The number of supported tunnels, specific protocols and protocol options used for the tunnels ("tunnel operations") can depend on various factors.

At step 904, the SD-WAN application can detect update conditions. The SD-WAN application can detect an update condition for the SD-WAN application using the historic or predictive data relating to the connectivity or usage of the client device. For example, the update condition can be a user leaving their office (and correspondingly the client no longer being connected to an office network). When the user leaves the office, the SD-WAN application can switch from a Wi-Fi or office network to a cellular network. If the SD-WAN application identifies that a user is expected to leave their office at 6:00, then the SD-WAN application can anticipate the switch at 6:00. The update condition may be or include a condition in which the SD-WAN application identifies where the SD-WAN application is to update a configuration or setting for the SD-WAN application. For example, the update condition may be or include a prediction that a user is going to leave the office at a particular time, that a user will access a particular resource or application at a particular time, etc.

The SD-WAN application can identify the update condition based on the historic or predictive data. For example, and in some implementations, the SD-WAN application ingests or otherwise receives the historic data for generating or otherwise deriving one or more trends. The SD-WAN application can generate the one or more trends by performing or applying a pattern recognition algorithm to the historic data. The trends may indicate frequently occurring conditions at a particular time of day or day of the week. The SD-WAN application can use the trends to predict a likelihood or probability of a similar condition occurring at a future time. If the probability exceeds a predetermined threshold, the SD-WAN application can identify the condition as an update condition.

Similarly, and in some implementations, the SD-WAN application to ingest or otherwise receive predictive data and parse the predictive data. The SD-WAN application can parse the predictive data to identify potential conditions. The SD-WAN application can identify a location and/or time for scheduled meetings, messages exchanged relating to potential calls or meetings, and so forth based on data extracted from the predictive data responsive to parsing the predictive data. For example, the SD-WAN application can identify SMS messages regarding a potential meeting responsive to applying a natural language processing model to the SMS message. As another example, the SD-WAN application can identify a scheduled meeting responsive to applying a field-value extraction model to a calendar entry to identify a time, location, and acceptance value for the calendar entry. In these examples, the SD-WAN application can identify the potential meetings as update conditions.

In some implementations, the SD-WAN application can detect or identify the update condition corresponding to that is based on the remote tunnel destinations. For example, the update condition can be based on a number of supported tunnels, specific protocols, and protocol options used for the tunnels that depends on capabilities of the remote tunnel destinations. In another example, the update condition can be based available CPU processing capacity. In another example, the update condition can use different ciphers that are based on availability of hardware acceleration for the configuration.

The SD-WAN application can detect or identify the update condition corresponding to a number of supported tunnels, and specific protocols and protocol options used for the tunnels can depend on available energy supply. For example, the SD-WAN application can establish or use more tunnels, more paths, or more sophisticated QoS when plugged in and establish or use fewer tunnels or paths when using battery power.

The SD-WAN application can detect or identify the update condition corresponding to a number of supported tunnels, specific protocols, or protocol options used for the tunnels based on current locations of the remote tunnel destinations. For example, the SD-WAN application can use GPS data to determine the location of the remote tunnel destinations. The SD-WAN application can detect or identify the update condition corresponding to a number of supported tunnels, specific protocols, or protocol options used for the tunnels that depends on anticipated change in the location of the remote tunnel destinations. For example, the SD-WAN application can identify the movement history of a user (e.g., when they are at the office), or receive location information from other sources such as the calendar application that provides historic calendar data and predictive calendar data.

The SD-WAN application can detect or identify the update condition corresponding to a number of supported tunnels, specific protocols, and protocol options used for the tunnels that includes reactive or proactive adjustment of tunnel operations, such as setting up new tunnels or terminating existing tunnels, or changing the usage pattern of underlying network connections.

To detect the update condition, the SD-WAN application can determine a predicted change from a first location of the client device using a first connection type supported by the SD-WAN application to a second location of the client device using a second connection type supported by the SD-WAN application. The client can collect historical or predictive information about application usage, location, or network environment. For example, the client can collect application usage history, history of network locations, or history of connectivity provided by specific physical networks (Wi-Fi, cellular) associated with geographic location where access through such networks was attempted. The SD-WAN application can determine the predicted change based on the historic or predictive data. With both sources of information about future demands for SD-WAN functionality, the client and the rest of the SD-WAN system can implement ahead-of-time adjustments in their mode of operation.

The first connection type can be a Wi-Fi connection type, and the second connection type can be a cellular connection type. For example, anticipating the change in endpoint (and user) location from an office or home network with high-quality Wi-Fi connectivity to being "on the road" without Wi-Fi connectivity, the client can proactively change the role of a cellular network connection and the corresponding NIC and path from "backup" to "primary," ensuring uninterrupted application connectivity as the user moves among different locations. When the user arrives at a location where Wi-Fi connectivity is available, and the prediction indicates that the user will stay in this location for a while, the SD-WAN application can change the cellular physical connection role to "backup" and restore the Wi-Fi physical connection role to "primary."

To detect the update condition, the SD-WAN application can determine a predicted application traffic for the client device. The client can collect predictive information about application usage. The SD-WAN application can determine the predicted application traffic based on the historic or predictive data. The client can collect calendar data from the calendar application. The client can collect communications data from the communications application. For example, the calendar data and the communication data can indicate upcoming network communication sessions (meetings, conference calls) that provide indication that specific types or network connectivity. For example, the information can show real-time or voice connectivity.

To update the configuration, the SD-WAN application can establish a first tunnel and a second tunnel for the predicted application traffic. For example, if a voice or video conference is predicted, the client can establish a tunnel for the predicted application traffic. To detect the update condition, the SD-WAN application can determine, based on the calendar data or the communication data, whether to establish a session for the client device at a second time subsequent to a current time. For example, the tunnel can be to a remote tunnel destination (e.g., service POP) best equipped for optimal service for the online conference that is about to start. The SD-WAN application can determine a predicted session modality for the session to be established. For example, the SD-WAN application can determine whether the conference will include audio or video calls.

The SD-WAN application can determine a quality of service (QOS) value for the session. The SD-WAN application can select or identify the tunnels to provide SD-WAN quality of service ("QoS") features over virtual network connections. The SD-WAN application can dynamically reallocate available bandwidth among network traffic types, tunnels, or their combinations. For example, if the session is a conference call, the SD-WAN application can determine or identify the attendees. If the SD-WAN application determines that all the attendees belong to the same entity or network, the SD-WAN application can identify a first QoS value (e.g., low priority value since the call is among co-workers). If the SD-WAN application determines that all the attendees belong to different entities or networks, the SD-WAN application can identify a second QoS value (e.g., high priority value since the call is among VIP users).

The SD-WAN application can reallocate bandwidth based on demand or other metrics. The SD-WAN application can provide QoS to multiple physical connections. The SD-WAN application can provide QoS by improving connection latency by selecting the optimal physical connection (e.g., path 507) for individual tunneled data packets. The SD-WAN application can provide QoS by improving connection reliability through packet retransmissions or forward error correction. The SD-WAN application can provide QoS by identifying packet duplication.

To update the configuration of the SD-WAN application, the SD-WAN application can establish the session based on the predicted session modality and the QoS value prior to the second time. For example, the SD-WAN application can identify a QoS value of a potential session, and determine whether the conference will include audio or video calls. For example, if the session is an audio call, then the SD-WAN application can determine that since audio calls are not disrupted by lower quality connections, the SD-WAN application can identify or assign a first QoS value (e.g., low priority value). If the SD-WAN application determines or identifies if the session is a video call, then the SD-WAN application can determine that since video calls can be disrupted by lower quality connections, the SD-WAN application can identify or assign a second QoS value (e.g., high priority value).

Based on the QoS value and the modality, the SD-WAN application can provide reserved bandwidth for specific types of network traffic or the SD-WAN application can identify or reserve bandwidth for specific tunnels or paths (e.g., reserve bandwidth for video calls or for calls for VIP). In another example, the SD-WAN application can anticipate the need for a particular type of application traffic to be handled with additional QoS or with additional security features. For example, the SD-WAN application can detect an upcoming communication session based on the calendar data or the communication data (e.g., an upcoming conference call). In another example, the SD-WAN application can detect an upcoming communication session based on calendar data or the communication data received or supplied through the integration APIs. In another example, the SD-WAN application can detect an upcoming communication session based on calendar data or the communication data received by identifying that the remote tunnel destination is communicating with the communication application to start a communication session (e.g., call is about to start).

The SD-WAN application can establish or generate an additional tunnel or an additional path for the anticipated application traffic. For example, the SD-WAN application can establish a path for using cellular services as a backup for a path using Wi-Fi services. The SD-WAN application can establish a tunnel to a specific remote tunnel destination or remote site associated with the communications application. The SD-WAN application can change the configuration of an existing tunnel. For example, the SD-WAN application can change the status of a cellular physical connection and related path from "standby" to "active" to reduce the time needed to react to traffic disruption and implement transparent traffic failover from Wi-Fi to cellular (e.g., if the Wi-Fi connection fails, then the switch to cellular is faster because it is on standby). Similarly, at the end of the communication session, the SD-WAN application can revert the changes described above as a means to minimize the cost of network connectivity, the load and associated costs for remote tunnel destinations, or endpoint energy usage.

At step 906, the SD-WAN application can update configurations of SD-WAN. The SD-WAN application can update the configuration of the SD-WAN application responsive to detecting the update condition. The SD-WAN application can route application traffic to one of the available tunnels based on the match of application traffic properties (classification), endpoint posture, location and network environment, and the properties of the tunnel or its destination. For example, the SD-WAN application can implement rules defined in the policy. The SD-WAN application can implement rules to route application traffic flows matching certain rules, or not matching any other rules, to one of the tunnels leading to general purpose POPs. The SD-WAN application can select a specific remote tunnel destination or one of several equivalent POPs. The SD-WAN application can select the remote tunnel destination based on dynamically determined tunnel characteristics (available bandwidth, latency, packet loss). The SD-WAN application can choose the remote tunnel destination based on its characteristics (proximity to the final-destination, POP load level, customer entitlements, usage quota).

The SD-WAN application can implement rules to route application traffic flows among different remote tunnel destinations, cloud POPs, or SD-WAN sites based on the distinction between physical applications (installed or executed locally on the endpoint) and virtual applications (accessed through an application virtualization framework). The SD-WAN application can implement rules to route application traffic flows among different remote tunnel destinations, cloud POPs, or SD-WAN sites based on individual virtual or managed applications being hosted at or accessible through specific remote tunnel destinations, POPs, or SD-WAN sites. The SD-WAN application can implement rules to route application traffic flows among different remote tunnel destinations, cloud POPs, or SD-WAN sites based on applications that are unmanaged (self-installed) versus managed (sanctioned and/or delivered through the application management framework). The SD-WAN application can implement rules to route application traffic flows among different remote tunnel destinations, cloud POPs, or SD-WAN sites based on other metadata about applications that may be supplied by the managed application client.

The SD-WAN application can implement rules to determine applicability of these routing rules based on endpoint characteristics, such as application versioning, endpoint posture, location and network environment. The SD-WAN application can implement rules to implement multiple application traffic routing rules and apply them in a particular order of precedence, including, for example, applying relevant security-sensitive rules before corresponding traffic delivery optimization rules.

The SD-WAN connectivity policy provisioned to the client can depend on the security circumstances of the client and provide several graduated levels of connectivity service. The SD-WAN application can perform an assessment of endpoint security (e.g., whether the endpoint has the elements of enterprise management framework) and network security (e.g., whether the endpoint is in a known secure location, or whether the endpoint is in a country foreign to where the customer using the SD-WAN service is domiciled). The SD-WAN application can report this assessment to the SD-WAN service when establishing, or re-establishing, service connectivity.

Based on the assessment reported by the endpoint or application, the service may choose to send different provisioning profiles to the SD-WAN application. For example, the service may include tunnels enabling connectivity to more sensitive locations in the provisioning profile to a client considered to be in a more secure environment. Similarly, some tunnels may include fewer security features (e.g., faster but less secure ciphers). Profiles sent to less secure endpoints or locations may be filtered to remove sensitive cryptographic material. The multi-tunnel capable SD-WAN client application can provide the optimal level of service for each environment where the user may find themselves.

The SD-WAN application can update the configuration of the tunnels by switching a designation of a network connection from a primary connection to a back-up connection. The SD-WAN application can make the switch by anticipating the change in endpoint (and user) location. For example, the SD-WAN application can anticipate a change in the user's location from an office or home network with high-quality Wi-Fi connectivity to being "on the road" without Wi-Fi connectivity. The SD-WAN application can update the configuration based on the change in location.

Based on the updated configuration, the SD-WAN application can establish a tunnel for the application traffic. For example, the SD-WAN application can establish multiple network tunnels to different remote tunnel destinations. The SD-WAN application can proactively modify or change the role of a secondary cellular physical network location and the corresponding NIC and path for one or more tunnels from "backup" to "primary." The SD-WAN application can modify the configuration to ensure uninterrupted application connectivity as the user moves among different location. The SD-WAN application can be configured to revert the change. For example, when the user arrives at a location where Wi-Fi connectivity is available, the SD-WAN application may change the cellular physical connection role to "backup" and restore the Wi-Fi physical connection role to "primary."

At step 908, the SD-WAN application can transmit application traffic. The SD-WAN application can transmit application traffic via the tunnels established based on the updated configuration. To transmit the application traffic using the updated configuration, the SD-WAN application can load balance the application traffic between the first path and the second path. For example, the SD-WAN application can simultaneously change the cellular and Wi-Fi connections from "backup" and "primary" to "load-balanced." The change can ensure that any connection failover will take minimal time and avoid any traffic disruptions, such as during the conference call. The SD-WAN application can revert this change. For example, the SD-WAN application can revert the change when the conference ends and if there are no other conferences starting thereafter. The SD-WAN application can reverse the normal configuration to reduce resource usage (e.g., battery drain) and cost of service.

H. Systems and Methods for Managing Network Services by an SD-WAN Application and an SD-WAN Device Enterprise customers can be reluctant to deploy a particular SD-WAN solution when they either have an existing SD-WAN solution from a different vendor, an entrenched non-SD-WAN wide area and Internet access solution, or when demand for SD-WAN features does not span the whole organization. This problem can be caused by an "all-or-nothing" deployment mode of SD-WAN, whereby an SD-WAN appliance deployed at a site handles all wide-area and Internet traffic for that site.

The systems and methods described here include an SD-WAN client application enabling lightweight SD-WAN appliance deployment and rich application classification on the appliance. The systems and methods described here relate to interoperability between a virtualized SD-WAN and an SD-WAN appliance, which allows for more lightweight SD-WAN appliances through application classification tags and other information shared by the virtualized SD-WAN to the SD-WAN appliance.

According to the implementations and implementations described herein, a software-defined wide area network (SD-WAN) application executing on a client device can detect, by a software-defined wide area network (SD-WAN) application executing on a client device, a presence of an SD-WAN device. The SD-WAN application can establish, by the SD-WAN application, a connection between the SD-WAN application and the SD-WAN device. The SD-WAN application can update, by the SD-WAN application, a configuration of the SD-WAN application, to cause the SD-WAN application to interoperate with the SD-WAN device for managing one or more network services.

Such implementations can enable lightweight SD-WAN appliance deployment, which allows the SD-WAN to coexist with other wide area connectivity frameworks, and thus reduces customer reluctance to adopt SD-WAN for some of their application traffic delivery needs. Various other advantages are described in greater detail below.

Figure 10:
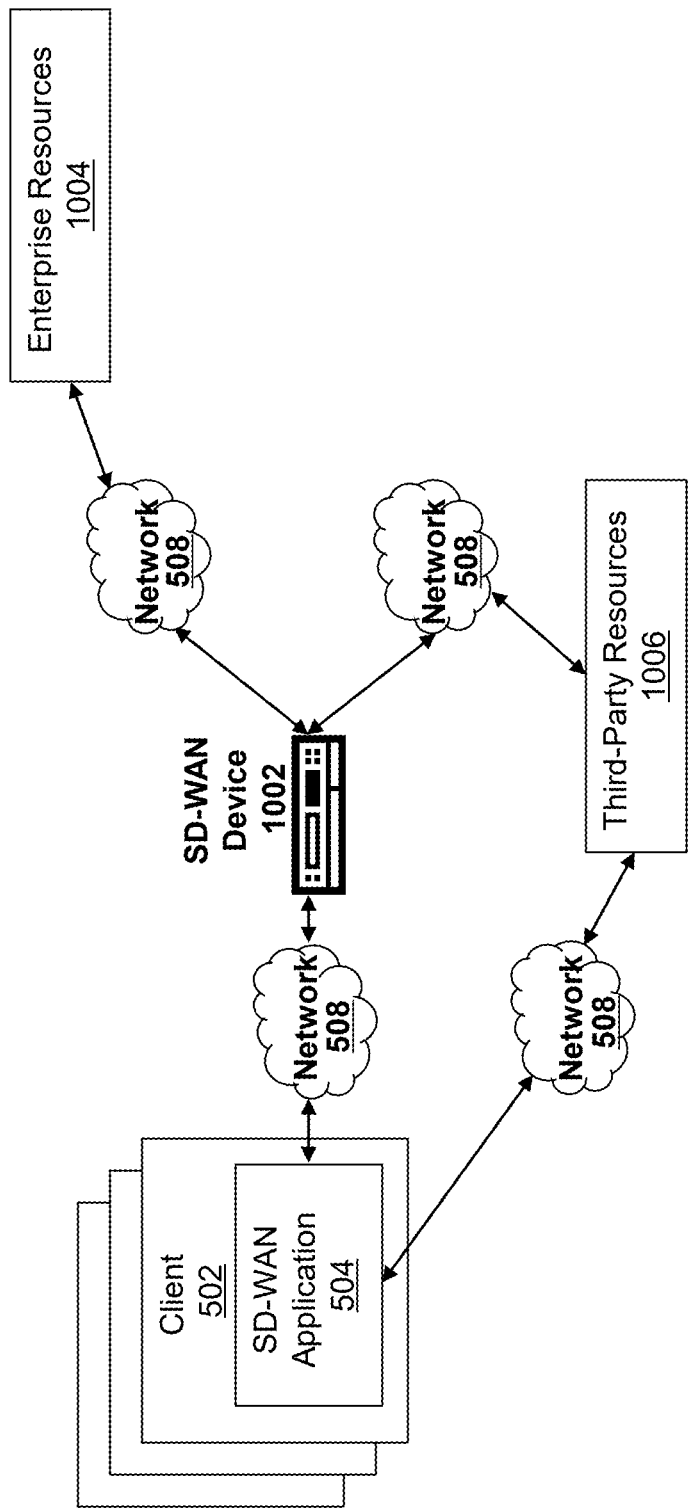
FIG. 10 is a block diagram of a system for managing network services by an SD-WAN application and an SD-WAN device, in accordance with an illustrative implementation.

Referring now to FIG. 10, depicted is a block diagram of a system 1000 for multi-link SD-WAN, according to illustrative implementations. The system 1000 is shown to include an SD-WAN device 1002 in communication with enterprise resources 1004 and third-party resources 1006 via the network.

The systems and methods of the present solution may be implemented in any type or form of device, including clients, servers, or appliances described above with reference to FIG. 1A-FIG. 4. For example, the SD-WAN device 1002 may be implemented as embodied upon or otherwise incorporated into an appliance 200 described above with reference to FIG. 2-FIG. 4. In some implementations, the SD-WAN device 1002 may include or incorporate components and devices similar in some aspects to those described above with reference to FIG. 1C, such as a memory and/or one or more processors operatively coupled to the memory. The present systems and methods may be implemented in any implementations or aspects of the appliances or devices described herein.

The SD-WAN application 504 can be configured to be a software-defined wide area network (SD-WAN) application executing on a client 502. The SD-WAN application 504 can be configured to detect a presence of an SD-WAN device 1002. The SD-WAN application 504 can be configured to detect the presence of the SD-WAN device 1002 in the local network environment. To detect the presence of the device, the SD-WAN application 504 be configured to can determine that the SD-WAN device 1002 is on a network of the client 502 and that the SD-WAN device 1002 is compatible with the SD-WAN device 1002. The SD-WAN application 504 can be configured to identify the presence of a compatible appliance and establish a trusted association with that appliance. The tunnel selector 602 can detect connectivity to remote tunnel destinations 616 such as compatible cloud access service and other network services. In some implementations, the client 502 can implement rules to establish a trusted association with that device and modify the application traffic routing rules based on this detection. The SD-WAN application 504, in addition to its normal SD-WAN capabilities designed for operation in arbitrary networks 510, can include the ability to detect the presence of a compatible SD-WAN device 1002 and, if desired, can establish a trusted association or connection with that SD-WAN device 1002.

The compatible device can deploy in a typical border gateway configuration (the "heavyweight" deployment option), or may, for the purpose of this section, be deployed in parallel to the existing network border elements (SD-WAN devices, gateways, etc.) (the "lightweight" deployment possibility). In the lightweight deployment scenario, application traffic from endpoints 512 that do not have the SD-WAN application 504 installed can be routed through existing network infrastructure. This can ensure that deployment of an SD-WAN device 1002 does not disrupt the existing network. The SD-WAN application 504, on the other hand, can detect the device even if it is not on the default network route.

The SD-WAN application 504 can be configured to probe a resource for identifying the SD-WAN device 1002. In one implementation, the SD-WAN application 504 can be configured to generate probes or connection requests for well-known host names configured to point to the device. The probes may be sent using multicast protocols. In another implementation, the SD-WAN application 504 can be configured to query a remote service for information about devices that may be available on the local network. The SD-WAN device 1002 can detect the presence of the SD-WAN device 1002 based on a response from the resource. The SD-WAN application 504 can be configured to use local service discovery techniques.

The SD-WAN application 504 can be configured to broadcast SD-WAN device 1002 discovery requests. The SD-WAN application 504 can be configured to receive, from the SD-WAN device 1002, a discovery request on a network of the client 502. For example, the SD-WAN device 1002 can transmit a discovery request to establish a Bluetooth connection. The SD-WAN application 504 can be configured to detect the presence of the SD-WAN device 1002 based on the discovery request. For example, the SD-WAN application 504 can be configured to detect the presence of the SD-WAN device 1002 responsive to receiving the discovery request.

The SD-WAN application 504 can be configured to detect the presence of the SD-WAN device 1002 at a first time instance. For example, the SD-WAN application 504 can be configured to detect the presence of the SD-WAN device 1002 while the user is at their office location. The SD-WAN application 504 can be configured to switch from the second configuration of the SD-WAN application 504 to the first configuration to cause the SD-WAN application 504 to manage the network services. For example, the SD-WAN application 504 can be configured to switch the configurations when the user leaves the office.

To update the configuration, the SD-WAN application 504 can be configured to switch from a first configuration to a second configuration to cause the SD-WAN application 504 to interoperate with the SD-WAN device 1002 for managing the network services. For example, the SD-WAN application 504 can be configured to update the configuration when the user leaves the office. The SD-WAN application 504 can be configured to detect an absence of the SD-WAN device 1002 at a different time. For example, the SD-WAN application 504 can be configured to detect the absence of the SD-WAN device 1002. In another example, if the initial detection is at the first time instance, then the SD-WAN device 1002 can detect the absence at a second time instance after the first time instance (e.g., the user leaves their office location in the evening). At a first time instance (e.g., initial time), the SD-WAN application 504 and the SD-WAN device 1002 are connected to a first network. For example, the first network is the office network used while the user is at their office. At a different time (e.g., second time instance), the SD-WAN device 1002 is not connected to the first network. For example, the user is disconnected from the office network when they go home.

The SD-WAN application 504 can be configured to establish a connection between the SD-WAN application 504 and the SD-WAN device 1002. After finding and securely associating with the SD-WAN device 1002, the SD-WAN application 504 can be configured to change or modify its normal SD-WAN behavior. For example, instead of setting up tunnels 506 to remote tunnel destinations or remote cloud or site POPs, the SD-WAN application 504 can be configured to set up a local tunnel to the SD-WAN device 1002 and use it to send most of application traffic through the device. The local tunnel established in this manner may use the same or a different protocol compared to the regular tunnels 506. In one possible implementation, the local tunnel may use one of the standard (non-SD-WAN) tunneling protocols such as IPsec. In another implementation, the local tunnel may use the same SD-WAN protocol as regular tunnels 506, but turn off some features or implementation complexity that are not necessary for ensuring connection quality for a local tunnel with typically high bandwidth and reliability and low latency. This action can be suitable for the "lightweight" SD-WAN device 1002 deployment mode that makes such deployment useful.

The SD-WAN application 504 can be configured to use the tunnel 506 set up to the SD-WAN device 1002 to transmit or carry, in addition to application traffic, application classification tags and other information that the tunnel client normally uses for application-specific routing. The device in turn can use these tags to implement multi-tunnel application-aware routing on behalf of all connected clients.

The SD-WAN application 504 may forgo establishment of some or all network tunnels 506, or enable some tunnels 506 that would otherwise be disabled, in the environment where a local SD-WAN device 1002 provides site-wide connectivity for some application traffic. Even in such an environment, the SD-WAN application 504 can be configured to establish tunnels 506. For example, the SD-WAN application 504 can be configured to establish tunnels 506 to enforce security or traffic delivery rules that cannot be enforced by the SD-WAN device 1002.

The SD-WAN application 504 can be configured to selectively disable or enable some connectivity policy rules in the environment where a local SD-WAN device 1002 provides site-wide connectivity for some application traffic. The SD-WAN application 504 can be configured to disable or enable tunnels 506 or connectivity policy rules based on characteristics of the applications, such as a version of the application or its status.

The SD-WAN application 504 can be configured to maintain different connections to each remote endpoint (e.g., enterprise resources 1004 and third-party resources 1006). The SD-WAN application 504 can be configured to receive first network traffic for enterprise resources 1004 (e.g., resources of an institution) via the established connection from the SD-WAN device 1002. The SD-WAN application 504 can be configured to receive second network traffic for third-party resources 1006 (e.g., computing resources of entertainment providers) via the second connection from the remote endpoints 512.

Updating the configuration can cause the SD-WAN application 504 to transmit network traffic of the client 502 to the SD-WAN device 1002 via the connection. For example, the SD-WAN application 504 can be configured to determine or select to route the application traffic to the SD-WAN device 1002 for the SD-WAN device 1002 to route the application traffic to its destination or endpoint. In another example, the SD-WAN application 504 can be configured to select to route the application traffic instead of utilizing the SD-WAN device 1002. The SD-WAN application 504 can determine whether to utilize the SD-WAN device 1002 based on policy-based determinations such as latency or security. The SD-WAN device 1002 can be associated with a point-of-presence device ( ) device or a particular network channel to the endpoint directly.

Updating the configuration can cause the SD-WAN application 504 to transmit network traffic of the client 502 to the SD-WAN device 1002. For example, the SD-WAN application 504 can be configured to switch from a first configuration to a second configuration. In the first configuration, the SD-WAN application 504 can be configured to route the application traffic through tunnels 506. In the second configuration, the SD-WAN application 504 can be configured to route the application traffic to the SD-WAN device 1002, which would route the application traffic to the resources 1004, 1006. The SD-WAN application 504 can be configured to switch configurations by sending a command to the tunnel selector 602 to cause the tunnel selector 602 to switch settings according to the updated configuration. The SD-WAN application 504 can be configured to transmit data via the connection to the SD-WAN device 1002 by selecting the corresponding tunnel to the SD-WAN device 1002 and transmitting traffic on the tunnel.

The SD-WAN application 504 can update a configuration of the SD-WAN application 504 to cause the SD-WAN application 504 to interoperate with the SD-WAN device 1002 for managing one or more network services. For example, the SD-WAN application 504 can either send application traffic directly to the resources 1004, 1006 or can forward or offload that traffic routing and additional insight data to the SD-WAN device 1002, which can select channels to use for traffic routing. For example, if only approved SD-WAN applications have the ability and the permission to associate with the SD-WAN device 1002, then the deployment of the SD-WAN application 504 is possible in a network shared by enterprise and "guest" endpoints. The SD-WAN device 1002 can be established as a secure "gateway" to enterprise resources 1004 or as a gateway to the third-party resources 1006.

While handling application traffic using multiple tunnels 506 and applying the connectivity policy, the SD-WAN application 504 can collect statistical information and forward it to the SD-WAN device 1002. The SD-WAN device 1002 may use this information internally or make it available to tenants to perform service operations monitoring, usage experience monitoring, to enable usage and security analytics, including user behavior monitoring, risk detection, feedback loops, etc. Statistical information collected by the SD-WAN application 504, forwarded to the SD-WAN device 1002 and made available internally or to service customers can combine endpoint data (application, application versioning, endpoint posture, location and network environment), tunnel data (tunnel state, application QoS provided by the tunnel), and tunnel destination data (cloud POP or SD-WAN identification and state) to enable monitoring, assessment, analytics, and actions for multi-tunnel endpoint 512 client 502 and service operation.

To update the configuration of the SD-WAN application 504, the SD-WAN application 504 can switch from a first configuration of the SD-WAN application 504 to a second configuration of the SD-WAN application 504. The SD-WAN application 504 can implement rules to route application traffic flows matching certain rules, or not matching any rules, to one of the tunnels 506 leading to an SD-WAN device 1002. The SD-WAN application 504 can select a specific device or one of several equivalent devices. The SD-WAN application 504 can select the destination device based on tunnel characteristics (available bandwidth, latency, packet loss). The client 502 can choose the destination device based on device characteristics (advertised routes and proximity to the final-destination, device load level, etc.).

The first configuration can cause the SD-WAN application 504 to manage the network services via different connections of the SD-WAN application 504. The second configuration can cause the SD-WAN application 504 to interoperate with the SD-WAN device 1002 for managing the network services via the established connection. The SD-WAN device 1002 can maintain two sets of tunnels 506, one with SD-WAN client applications 504, and another with internal application resources 1004, 1006, and would place a set of application proxies in the middle. Network routing and firewall functionality within the SD-WAN device 1002 can be configured to prohibit direct connectivity between some clients and internal resources, and only allow connectivity if intermediated through the application proxy. The proxy would include additional capabilities, such as user authentication, access control, malware prevention, and data loss prevention, providing the necessary level of security for this access. The SD-WAN tunnels 506 used between the client 502 and the SD-WAN device 1002, and between the SD-WAN device 1002 and the resources 1004, 1006 would ensure high quality of network connectivity.

The SD-WAN application 504 can assign tags to network traffic of the client 502. The SD-WAN application 504 can transmit the network traffic and the tags to the SD-WAN device 1002. The SD-WAN device 1002 can route the network traffic via channels of the SD-WAN device 1002 using the tags. The SD-WAN application 504 can completely or partially turn off its own tunneling. The SD-WAN client 502 can rely on the SD-WAN device 1002 to supply application traffic delivery services. This action can be suitable for traditional "heavyweight" SD-WAN deployments. The SD-WAN application 504 can provide uniform capabilities and user experience for application traffic delivery for users working from home or in the office. The SD-WAN application 504 can allow a fully featured SD-WAN solution with these capabilities to coexist, without any interference, with other WAN access implementations deployed in the same network.

Figure 11:
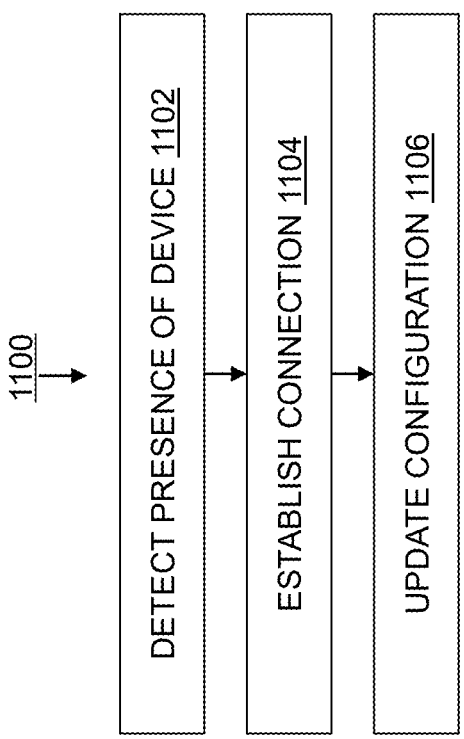
FIG. 11 is a flow diagram of a method for managing network services by an SD-WAN application and an SD-WAN device, in accordance with an illustrative implementation.

Referring to FIG. 11, depicted is a flow diagram of a method 1100 for managing network services by an SD-WAN application and an SD-WAN device, in accordance with an illustrative implementation. The method 1100 (including various steps included therein) may be implemented by one or more of the components shown in FIGS. 5, 6, 8, and 10 as described above, such as the client 502, SD-WAN application 504, SD-WAN device 1002, etc. As a brief overview, at step 1102, a SD-WAN application detects the presence of a device. At step 1104, the SD-WAN application establishes a connection. At step 1106, the SD-WAN application can update configurations.

At step 1102, a SD-WAN application detects the presence of a device. The SD-WAN application can be a software-defined wide area network (SD-WAN) application executing on a client (e.g., client 502). The SD-WAN application can detect a presence of an SD-WAN device. The SD-WAN application can detect the presence of the SD-WAN device in the local network environment. To detect the presence of the device, the SD-WAN application can determine that the SD-WAN device is on a network of the client and that the SD-WAN device is compatible with the SD-WAN device. The SD-WAN application can identify the presence of a compatible appliance and establish a trusted association with that appliance. The SD-WAN application can detect connectivity to remote tunnel destinations such as compatible cloud access service and other network services. In some implementations, the client can implement rules to establish a trusted association with that device and modify the application traffic routing rules based on this detection. The SD-WAN application, in addition to its normal SD-WAN capabilities designed for operation in arbitrary networks, can include the ability to detect the presence of a compatible SD-WAN device and, if desired, can establish a trusted association or connection with that device.

The compatible device can deploy in a typical border gateway configuration (the "heavyweight" deployment option), or may, for the purpose of this section, be deployed in parallel to the existing network border elements (SD-WAN devices, gateways, etc.) (the "lightweight" deployment possibility). In the lightweight deployment scenario, application traffic from endpoints that do not have the SD-WAN software client installed can be routed through existing network infrastructure. This can ensure that deployment of an SD-WAN device does not disrupt the existing network. The SD-WAN application, on the other hand, can detect the device even if it is not on the default network route.

The SD-WAN application can probe a resource for identifying the SD-WAN device. In one implementation, the SD-WAN application can generate probes or connection requests for well-known host names configured to point to the device. The probes may be sent using unicast or multicast protocols. In another implementation, the SD-WAN application can query a remote service for information about devices that may be available on the local network. The SD-WAN device can detect the presence of the SD-WAN device based on a response from the resource. The SD-WAN application can use local service discovery techniques.

The SD-WAN application can broadcast SD-WAN device discovery requests. The SD-WAN application can receive, from the SD-WAN device, a discovery request on a network of the client 502. For example, the SD-WAN device can transmit a discovery request to establish a Bluetooth connection. The SD-WAN application can detect the presence of the SD-WAN device based on the discovery request. For example, the SD-WAN application can detect the presence of the SD-WAN device responsive to receiving the discovery request.

The SD-WAN application can detect the presence of the SD-WAN device at a first time instance. For example, the SD-WAN application can detect the presence of the SD-WAN device while the user is at their office location. The SD-WAN application can switch from the second configuration of the SD-WAN application to the first configuration to cause the SD-WAN application to manage the network services. For example, the SD-WAN application can switch the configurations when the user leaves the office.

To update the configuration, the SD-WAN application can switch from a first configuration to a second configuration to cause the SD-WAN application to interoperate with the SD-WAN device for managing the network services. For example, the SD-WAN application can update the configuration when the user leaves the office. The SD-WAN application can detect an absence of the SD-WAN device at a different time. For example, the SD-WAN application can detect the absence of the SD-WAN device. In another example, if the initial detection is at the first time, then the SD-WAN device can detect the absence at a second time instance after the first time instance (e.g., the user leaves their office location in the evening). At a first time instance (e.g., initial time), the SD-WAN application and the SD-WAN device are connected to a first network. For example, the first network is the office network used while the user is at their office. At a different time (e.g., second time instance), the SD-WAN device is not connected to the first network. For example, the user is disconnected from the office network when they go home.

At step 1104, the SD-WAN application establishes a connection. The SD-WAN application can establish a connection between the SD-WAN application and the SD-WAN device. After finding and securely associating with the SD-WAN device, the SD-WAN application can change or modify its normal SD-WAN behavior. For example, instead of setting up tunnels to resources such as remote cloud or site POPs, the SD-WAN application can set up a local tunnel to the SD-WAN device and use it to send most of application traffic through the device. The local tunnel established in this manner may use the same or a different protocol compared to the regular tunnels. In one possible implementation, the local tunnel may use one of the standard (non-SD-WAN) tunneling protocols such as IPsec. In another implementation, the local tunnel may use the same SD-WAN protocol as regular tunnels, but turn off some features or implementation complexity that are not necessary for ensuring connection quality for a local tunnel with typically high bandwidth and reliability and low latency. This action can be suitable for the "lightweight" SD-WAN device deployment mode that makes such deployment useful.

The SD-WAN application can use the tunnel set up to the local device to transmit or carry, in addition to application traffic, application classification tags and other information that the tunnel client normally uses for application-specific routing. The device in turn can use these tags to implement multi-tunnel application-aware routing on behalf of all connected clients.

The SD-WAN application may forgo establishment of some or all network tunnels, or enable some tunnels that would otherwise be disabled, in the environment where a local SD-WAN device provides site-wide connectivity for some application traffic. Even in such an environment, the SD-WAN application can establish tunnels. For example, the SD-WAN application can establish tunnels to enforce security or traffic delivery rules that cannot be enforced by the SD-WAN device.

The SD-WAN application may selectively disable or enable some connectivity policy rules in the environment where a local SD-WAN device provides site-wide connectivity for some application traffic. The SD-WAN application to disable or enable tunnels or connectivity policy rules based on characteristics of the applications, such as a version of the application or its status.

The SD-WAN application can maintain different connections to remote endpoints. The SD-WAN application can receive first network traffic for enterprise resources (e.g., resources of an institution) via the established connection from the SD-WAN device. The SD-WAN application can receive second network traffic for third-party resources (e.g., computing resources of entertainment providers) via the second connection from the remote endpoints.

Updating the configuration can cause the SD-WAN application to transmit network traffic of the client to the SD-WAN device via the connection. For example, the SD-WAN application can determine or select to route the application traffic to the SD-WAN device for the SD-WAN device to route the application traffic to its destination or endpoint. In another example, the SD-WAN application can select to route the application traffic instead of utilizing the SD-WAN device. The SD-WAN application can determine whether to utilize the SD-WAN device based on policy-based determinations such as latency or security. The SD-WAN device can be associated with a point-of-presence device (POP) device or a particular network channel to the endpoint directly.

Updating the configuration can cause the SD-WAN application to transmit network traffic of the client to the SD-WAN device. For example, the SD-WAN application can switch from a first configuration to a second configuration. In the first configuration, the SD-WAN application can route the application traffic through tunnels. In the second configuration, the SD-WAN can route the application traffic to the SD-WAN device, which would route the application traffic to the resources. The SD-WAN application can switch configurations by sending a command to the SD-WAN application to cause the SD-WAN application to switch settings according to the updated configuration. The SD-WAN application can transmit data via the connection to the SD-WAN device by selecting the corresponding tunnel to the SD-WAN device and transmitting traffic on the tunnel.

At step 1106, the SD-WAN application can update configurations. The SD-WAN application can update a configuration of the SD-WAN application to cause the SD-WAN application to interoperate with the SD-WAN device for managing one or more network services. For example, the SD-WAN application can either send application traffic directly to the resources or can forward or offload that traffic routing and additional insight data to the SD-WAN device, which can select channels to use for traffic routing. For example, if only approved SD-WAN applications have the ability and the permission to associate with the SD-WAN device, then the deployment of the SD-WAN application is possible in a network shared by enterprise and "guest" endpoints. The SD-WAN device can be established as a secure "gateway" to enterprise resources or as a gateway to the third-party resources.

While handling application traffic using multiple tunnels and applying the connectivity policy, the SD-WAN application can collect statistical information and forward it to the SD-WAN device. The SD-WAN device may use this information internally or make it available to tenants to perform service operations monitoring, usage experience monitoring, to enable usage and security analytics, including user behavior monitoring, risk detection, feedback loops, etc. Statistical information collected by the SD-WAN application, forwarded to the SD-WAN device and made available internally or to service customers can combine endpoint data (application, application versioning, endpoint posture, location and network environment), tunnel data (tunnel state, application QoS provided by the tunnel), and tunnel destination data (cloud POP or SD-WAN identification and state)

to enable monitoring, assessment, analytics, and actions for multi-tunnel endpoint client and service operation.

To update the configuration of the SD-WAN application, the SD-WAN application can switch from a first configuration of the SD-WAN application to a second configuration of the SD-WAN application. The SD-WAN application can implement rules to route application traffic flows matching certain rules, or not matching any rules, to one of the tunnels 506 leading to an SD-WAN device. The SD-WAN application can select a specific device or one of several equivalent devices. The SD-WAN application can select the destination device based on tunnel characteristics (available bandwidth, latency, packet loss). The client can choose the destination device based on device characteristics (advertised routes and proximity to the final-destination, device load level, etc.).

The first configuration can cause the SD-WAN application to manage the network services via different connections of the SD-WAN application. The second configuration can cause the SD-WAN application to interoperate with the SD-WAN device for managing the network services via the established connection. The SD-WAN device can maintain two sets of tunnels, one with SD-WAN clients, and another with internal application resources, and would place a set of application proxies in the middle. Network routing and firewall functionality within the SD-WAN device can prohibit direct connectivity between clients and internal resources, and only allow connectivity if intermediated through the application proxy. The proxy would include additional capabilities, such as user authentication, access control, malware prevention, and data loss prevention, providing the necessary level of security for this access. The SD-WAN tunnels used between the client and the resources, and between the SD-WAN device and the resources would ensure high quality of network connectivity.

The SD-WAN application can assign tags to network traffic of the client. The SD-WAN application can transmit the network traffic and the tags to the SD-WAN device. The SD-WAN device can route the network traffic via channels of the SD-WAN device using the tags. The SD-WAN application can completely or partially turn off its own tunneling. The SD-WAN client can rely on the SD-WAN device to supply application traffic delivery services. This action can be suitable for traditional "heavyweight" SD-WAN deployments. The SD-WAN application can provide uniform capabilities and user experience for application traffic delivery for users working from home or in the office. The SD-WAN application can allow a fully featured SD-WAN solution with these capabilities to coexist, without any interference, with other WAN access implementations deployed in the same network.

Various elements, which are described herein in the context of one or more implementations, may be provided separately or in any suitable sub-combination. For example, the processes described herein may be implemented in hardware, software, or a combination thereof. Further, the processes described herein are not limited to the specific implementations described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

The invention claimed is:

1. A method comprising:
   detecting, by a software-defined wide area network (SD-WAN) application executing on a client device, a presence of an SD-WAN device;
   establishing, by the SD-WAN application, a connection between the SD-WAN application and the SD-WAN device; and
   updating, by the SD-WAN application, a configuration of the SD-WAN application, to cause the SD-WAN application to interoperate with the SD-WAN device for managing one or more network services;
   wherein the connection comprises a first connection, wherein updating the configuration of the SD-WAN application comprises switching, by the SD-WAN application from a first configuration of the SD-WAN application to a second configuration of the SD-WAN application, wherein the first configuration causes the SD-WAN application to manage the one or more network services via one or more second connections of the SD-WAN application, and wherein the second configuration causes the SD-WAN application to interoperate with the SD-WAN device for managing the one or more network services via the first connection.

2. The method of claim 1, wherein updating the configuration causes the SD-WAN application to transmit network traffic of the client device to the SD-WAN device via the connection.

3. The method of claim 1, wherein detecting the presence comprises determining, by the SD-WAN application, that the SD-WAN device is on a network of the client device and that the SD-WAN device is compatible with the SD-WAN appliance.

4. The method of claim 1, wherein the connection is a first connection, and wherein the SD-WAN application maintains one or more second connections to one or more remote endpoints, the method further comprising:
   receiving, by the SD-WAN application, first network traffic for one or more enterprise resources via the first connection from the SD-WAN device; and
   receiving, by the SD-WAN application, second network traffic for one or more third-party resources via the one or more second connections from the one or more remote endpoints.

5. The method of claim 1, further comprising receiving, by the SD-WAN application, from the SD-WAN device, a discovery request on a network of the client device, wherein detecting the presence of the SD-WAN device is based on the discovery request.

6. The method of claim 1, further comprising probing, by the SD-WAN application, a resource for identifying the SD-WAN device, wherein detecting the presence of the SD-WAN device is based on a response from the resource.

7. The method of claim 1, further comprising:
   assigning, by the SD-WAN application, one or more tags to network traffic of the client device; and
   transmitting, by the SD-WAN application, the network traffic and the one or more tags to the SD-WAN device, the SD-WAN device routing the network traffic via one or more channels of the SD-WAN device using the one or more tags.

8. The method of claim 1, wherein detecting the presence of the SD-WAN device is at a first time instance, wherein updating the configuration comprises switching from a first configuration to a second configuration causing the SD-WAN application to interoperate with the SD-WAN device for managing the one or more network services, the method further comprising:

detecting, by the SD-WAN application, an absence of the SD-WAN device at a second time instance after the first time instance; and switching, by the SD-WAN application, from the second configuration of the SD-WAN application to the first configuration, to cause the SD-WAN application to manage the one or more network services.

9. The method of claim 8, wherein, at the first time instance, the SD-WAN appliance and the SD-WAN device are connected to a first network, and wherein, at the second time instance, the SD-WAN appliance is not connected to the first network.

10. A device comprising:
one or more processors configured to:
detect, by a software-defined wide area network (SD-WAN) application executing on the device, a presence of an SD-WAN device;
establish, by the SD-WAN application, a connection between the SD-WAN application and the SD-WAN device; and
update, by the SD-WAN application, a configuration of the SD-WAN application, to cause the SD-WAN application to interoperate with the SD-WAN device for managing one or more network services;
wherein the connection comprises a first connection, wherein updating the configuration of the SD-WAN application comprises switching, by the SD-WAN application from a first configuration of the SD-WAN application to a second configuration of the SD-WAN application, wherein the first configuration causes the SD-WAN application to manage the one or more network services via one or more second connections of the SD-WAN application, and wherein the second configuration causes the SD-WAN application to interoperate with the SD-WAN device for managing the one or more network services via the first connection.

11. The device of claim 10, wherein updating the configuration causes the SD-WAN application to transmit network traffic of the device to the SD-WAN device via the connection.

12. The device of claim 10, wherein detecting the presence comprises determining, by the SD-WAN application, that the SD-WAN device is on a network of the device and that the SD-WAN device is compatible with the SD-WAN appliance.

13. The device of claim 10, wherein the connection is a first connection, wherein the SD-WAN application maintains one or more second connections to one or more remote endpoints, and wherein the one or more processors are further configured to:
receive, by the SD-WAN application, first network traffic for one or more enterprise resources via the first connection from the SD-WAN device; and
receive, by the SD-WAN application, second network traffic for one or more third-party resources via the one or more second connections from the one or more remote endpoints.

14. The device of claim 10, wherein the one or more processors are further configured to receive, by the SD-WAN application, from the SD-WAN device, a discovery request on a network of the device, wherein detecting the presence of the SD-WAN device is based on the discovery request.

15. The device of claim 10, wherein the one or more processors are further configured to probe, by the SD-WAN application, a resource for identifying the SD-WAN device, wherein detecting the presence of the SD-WAN device is based on a response from the resource.

16. The device of claim 10, wherein the one or more processors are further configured to:
assign, by the SD-WAN application, one or more tags to network traffic of the device; and
transmit, by the SD-WAN application, the network traffic and the one or more tags to the SD-WAN device, the SD-WAN device routing the network traffic via one or more channels of the SD-WAN device using the one or more tags.

17. The device of claim 10, wherein detecting the presence of the SD-WAN device is at a first time instance when the SD-WAN device and the SD-WAN appliance are connected to a first network, wherein updating the configuration comprises switching from a first configuration to a second configuration causing the SD-WAN application to interoperate with the SD-WAN device for managing the one or more network services, and wherein the one or more processors are further configured to:
detect, by the SD-WAN application, an absence of the SD-WAN device at a second time instance after the first time instance, wherein, at the second time instance, the SD-WAN appliance is not connected to the first network; and
switch, by the SD-WAN application, from the second configuration of the SD-WAN application to the first configuration, to cause the SD-WAN application to manage the one or more network services.

18. A non-transitory computer readable medium storing instructions that, when executed by one or more processors, cause the one or more processors to:
detect, by a software-defined wide area network (SD-WAN) application executing on a client device, a presence of an SD-WAN device;
establish, by the SD-WAN application, a connection between the SD-WAN application and the SD-WAN device;
update, by the SD-WAN application, a configuration of the SD-WAN application, to cause the SD-WAN application to interoperate with the SD-WAN device for managing one or more network services;
assign, by the SD-WAN application, one or more tags to network traffic of the device; and
transmit, by the SD-WAN application, the network traffic and the one or more tags to the SD-WAN device, the SD-WAN device routing the network traffic via one or more channels of the SD-WAN device using the one or more tags.

* * * * *